United States Patent [19]

Burke, Jr.

[11] 4,208,544
[45] Jun. 17, 1980

[54] CHECKER AND AUTOMATIC SYNCHRONIZER FOR CODING EQUIPMENT

[75] Inventor: William G. Burke, Jr., Hyattsville, Md.

[73] Assignee: ACF Industries, Incorporated, New York, N.Y.

[21] Appl. No.: 142,920

[22] Filed: Oct. 4, 1961

[51] Int. Cl.$^2$ .......................... H04M 3/22; H04L 9/00
[52] U.S. Cl. .................................. 178/22; 178/69 G; 179/175.2 C
[58] Field of Search .......................... 178/22, 69, 69 G; 250/6.02; 179/175.2, 175.2 C; 325/32, 33; 343/228

[56] References Cited

U.S. PATENT DOCUMENTS

| | | | |
|---|---|---|---|
| 2,562,761 | 7/1951 | Bayard et al. ........................... | 178/69 |
| 2,898,402 | 8/1959 | Cory et al. .............................. | 178/22 |
| 2,915,741 | 12/1959 | Magasiny ................................ | 178/69 |
| 2,967,908 | 1/1961 | Gray et al. .............................. | 178/69 |

Primary Examiner—Howard A. Birmiel
Attorney, Agent, or Firm—Irwin M. Lewis

EXEMPLARY CLAIM

1. A one way communication system comprising means for transmitting coded pulse data and synchronizing pulses from a transmitter to a receiver having a source of clock pulses, monitoring means connected to the receiver and responsive continuously to received data for producing an output signal indicative of a malfunction in said system, control means having an input connected to said monitoring means and having an "ON" condition output responsive to said monitoring means output signal and an "OFF" condition output, receiver adjusting means having an input connected to said monitoring means and an output connected to said receiver for readjusting said receiver responsive to said monitoring means output signal, transmitter adjusting means having its output connected to said transmitter for readjusting and instituting corrective action on the transmitter including the blocking of data transmission and the initiation of the transmission of synchronization pulses responsive at its input to the "ON" condition of said control means, a return line connecting the output of said control means to the input of said transmitter adjusting means, and means connecting said receiver to said control means for turning said control means to the "OFF" condition when the malfunction indicated by the output signal of the monitoring means has been corrected, said means for turning the control means "OFF" including means for delaying the turning off of the control means until a predetermined number of pulses free of the effects of the malfunction are received without interruption.

6 Claims, 47 Drawing Figures

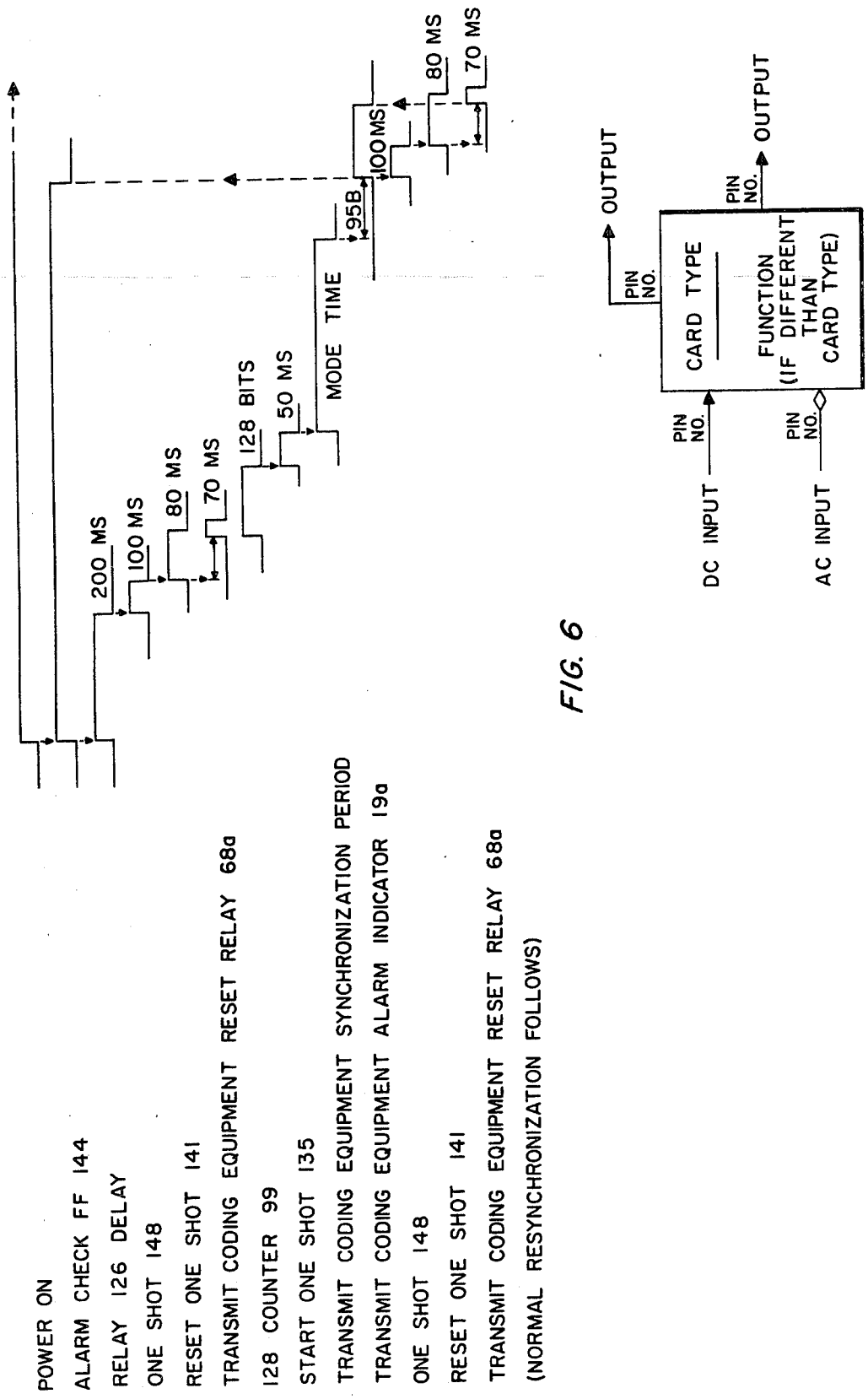

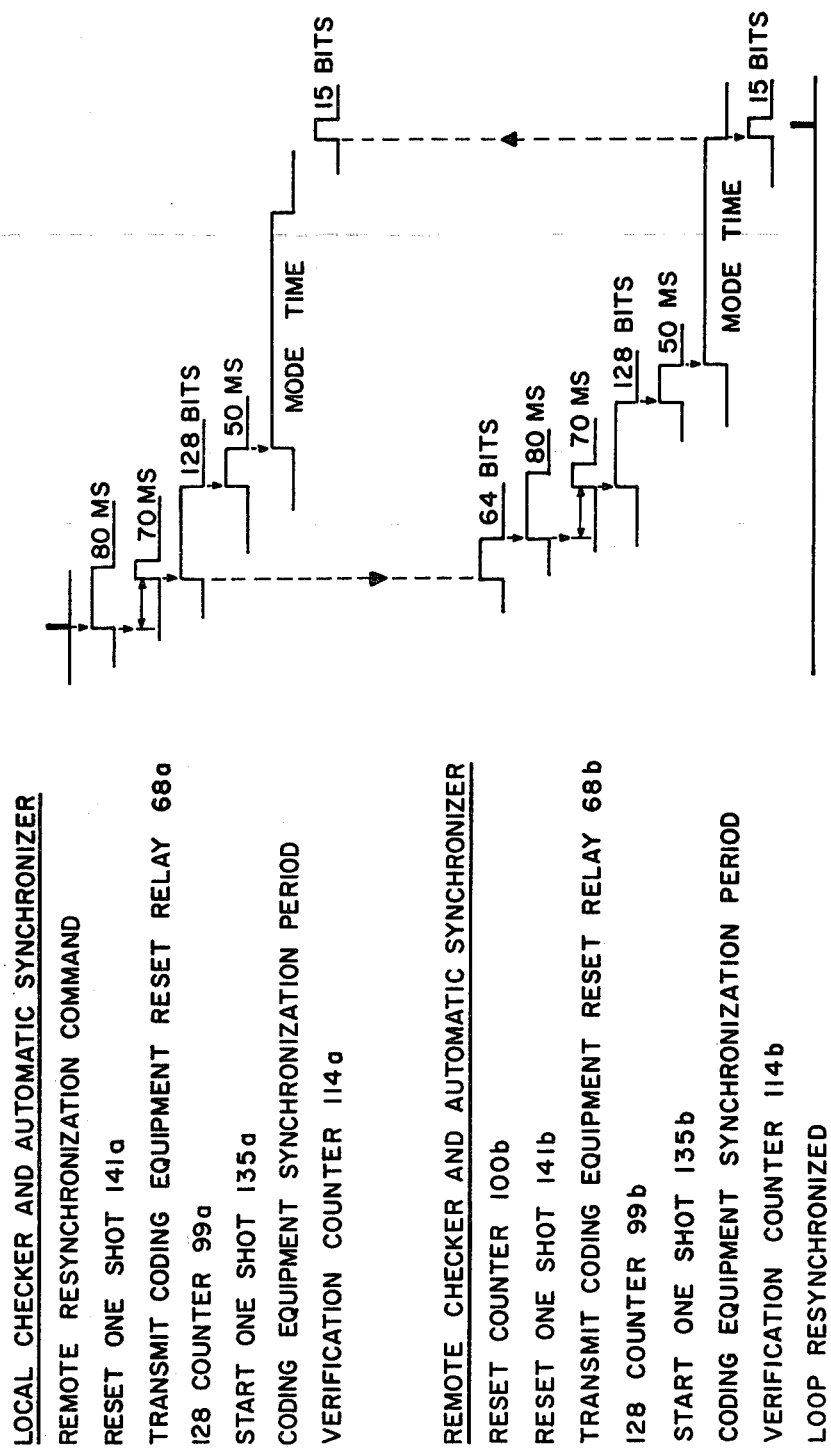

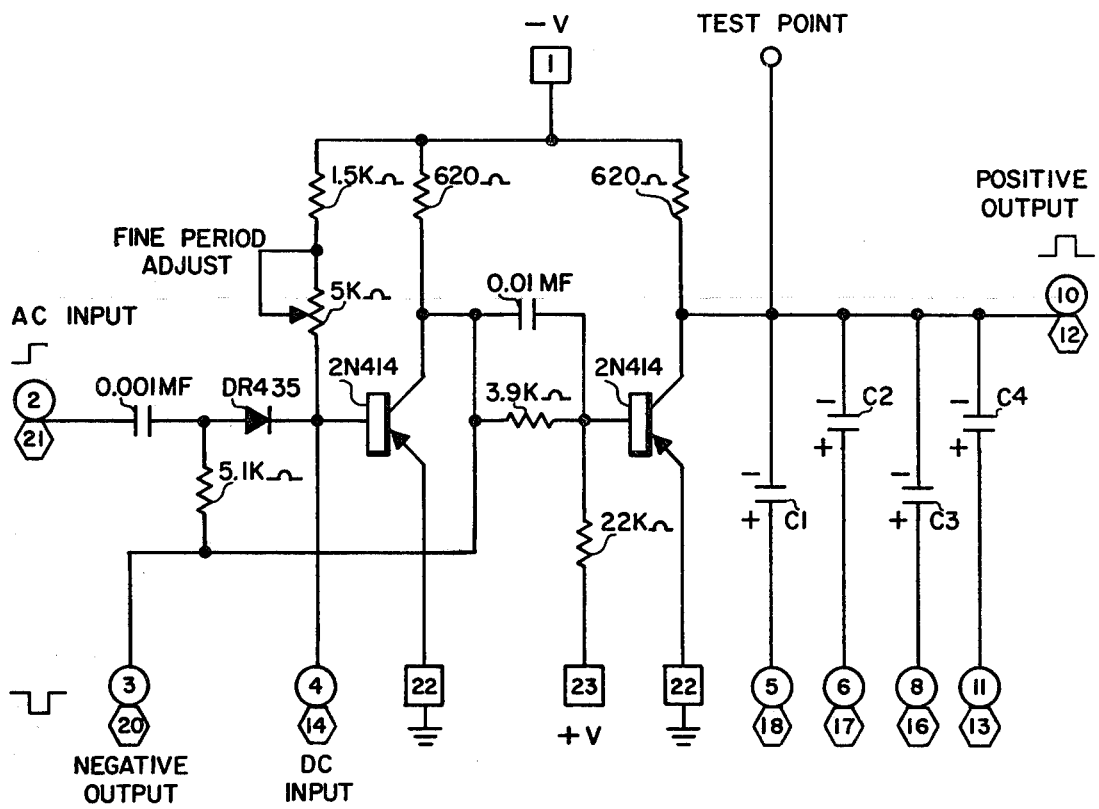
FIG. 8a
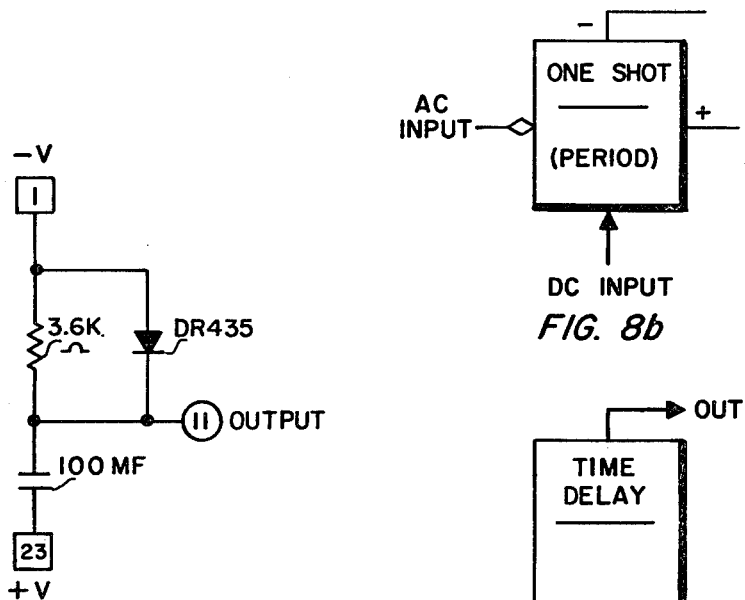
FIG. 8b
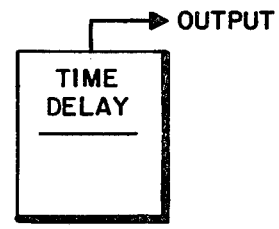
FIG. 19a
FIG. 19b

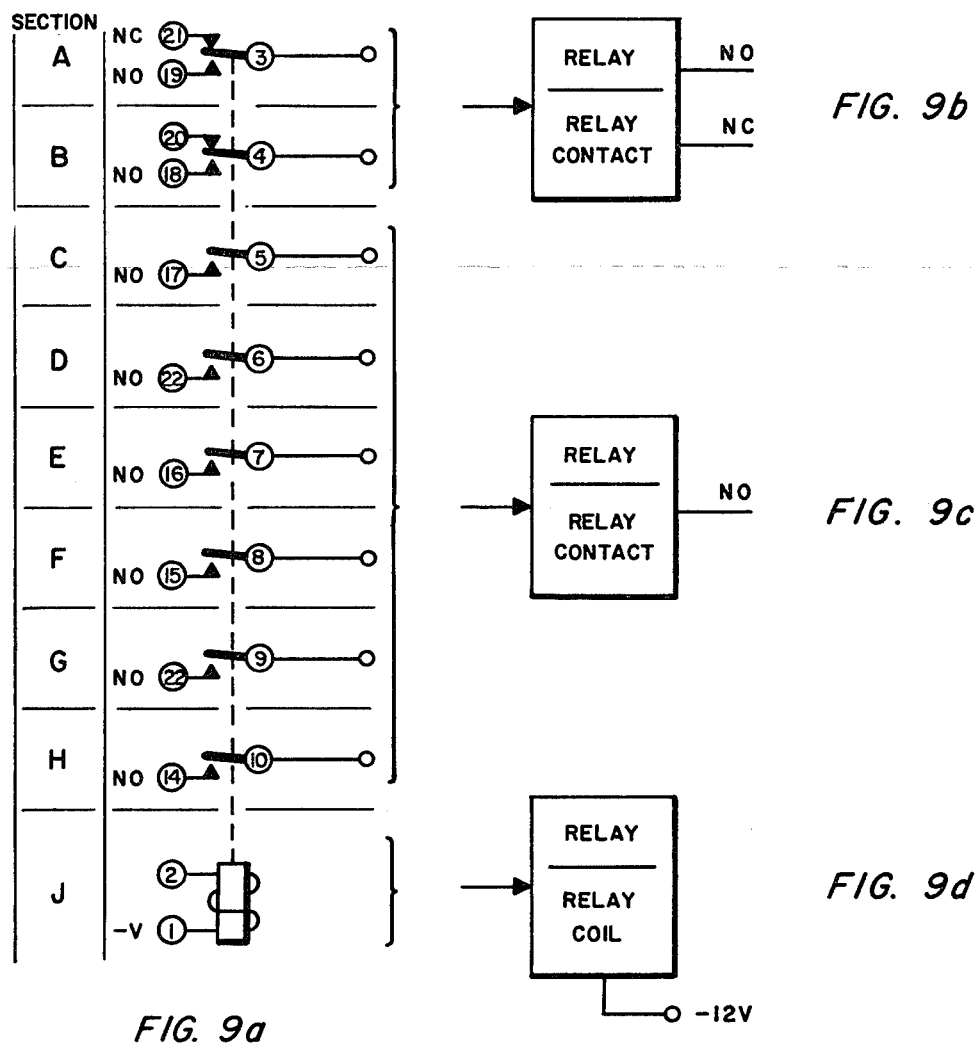
FIG. 9b
FIG. 9c
FIG. 9d
FIG. 9a
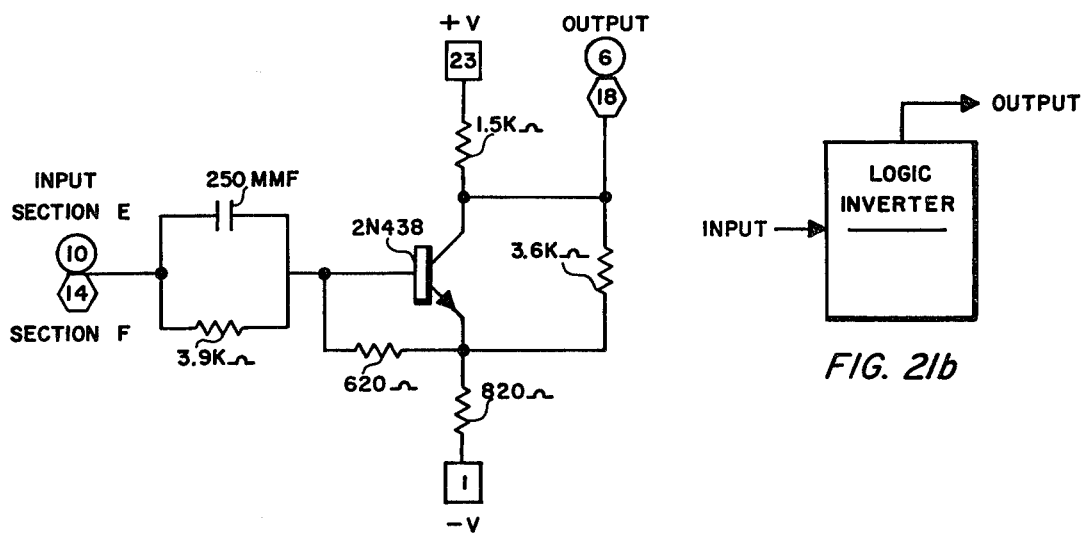
FIG. 21a
FIG. 21b

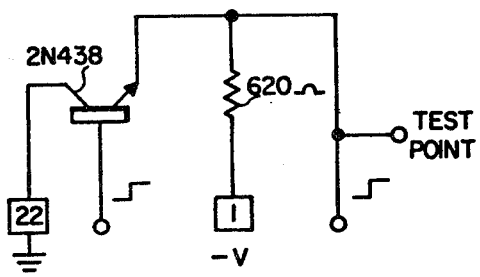
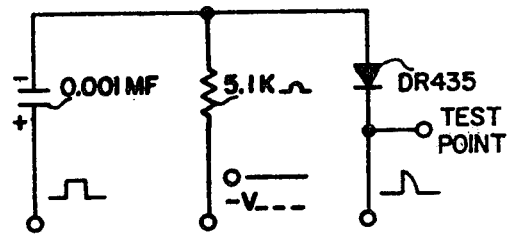
| INPUTS | SEC | OUTPUTS |
|---|---|---|
| 13 | A | 14 |
| 11 | B | 12 |
| 9 | C | 10 |
| 20 | D | 21 |
| 18 | E | 19 |
| 16 | F | 17 |
| PIN NO. | | PIN NO. |
*FIG. 11a*
| PULSE INPUTS | LEVELS | OUTPUTS | SEC |
|---|---|---|---|
| 5 | 4 | 3 | A |
| 8 | 7 | 6 | B |
| 11 | 10 | 9 | C |
| 13 | 14 | 15 | D |
| 16 | 17 | 18 | E |
| 19 | 20 | 21 | F |
| PIN NO. | PIN NO. | PIN NO. | |
*FIG. 12a*
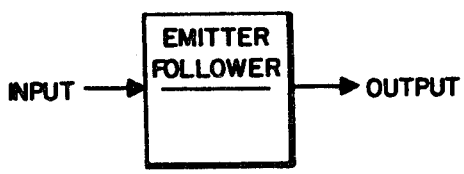
*FIG. 11b*
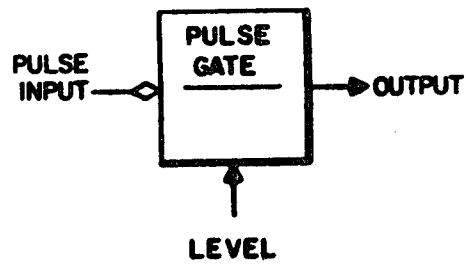
*FIG. 12b*
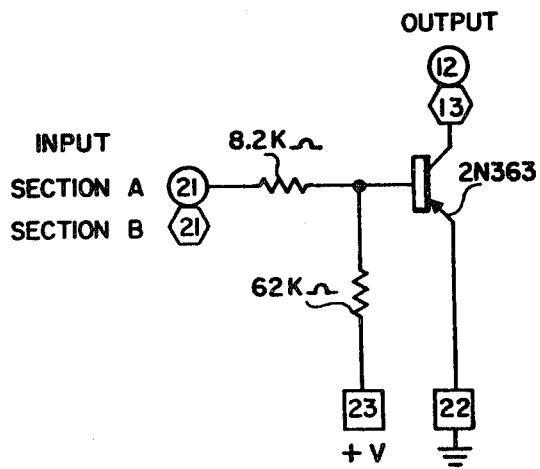
*FIG. 18a*
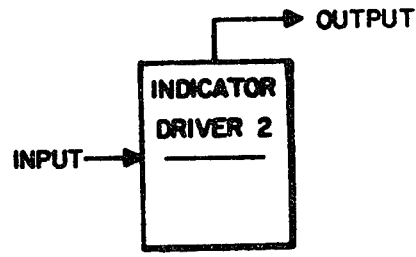
*FIG. 18b*

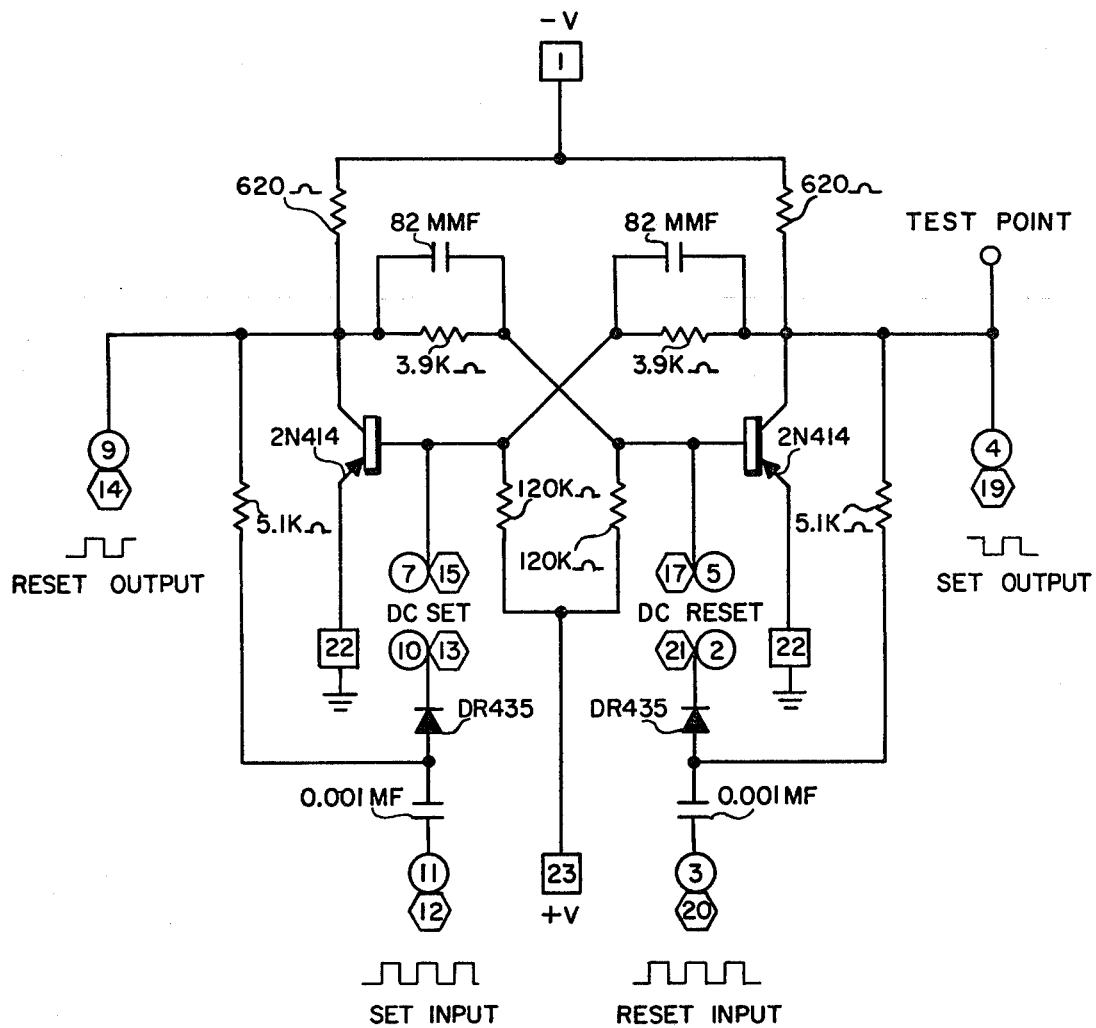
FIG. 13a
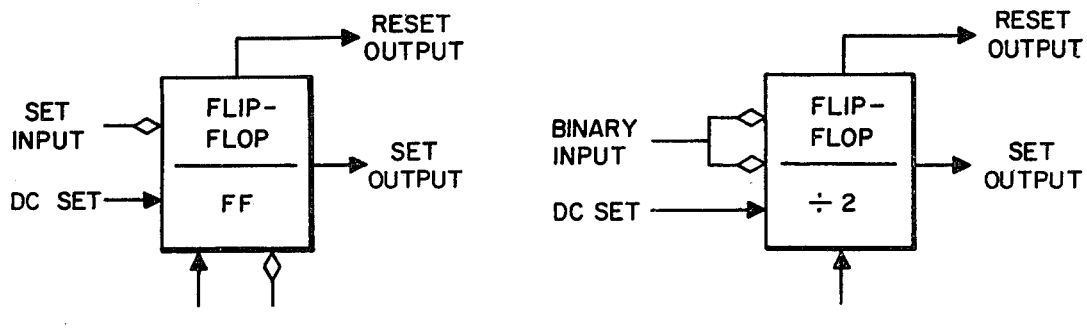
FIG. 13b
FIG. 13c

| INPUTS | | | | SECTION | OUTPUT |
|---|---|---|---|---|---|
| 2 | 3 | 4 | 5 | A | 6 |
| 7 | 8 | 9 | 10 | B | 11 |
| 12 | 13 | 14 | – | C | 16 |
| 17 | 18 | – | – | D | 21 |

| INPUTS | | | | SECTION | OUTPUT |
|---|---|---|---|---|---|
| 2 | 3 | 4 | 5 | A | 6 |
| 7 | 8 | 9 | 10 | B | 11 |
| 12 | 13 | 14 | – | C | 16 |
| 17 | 18 | – | – | D | 21 |

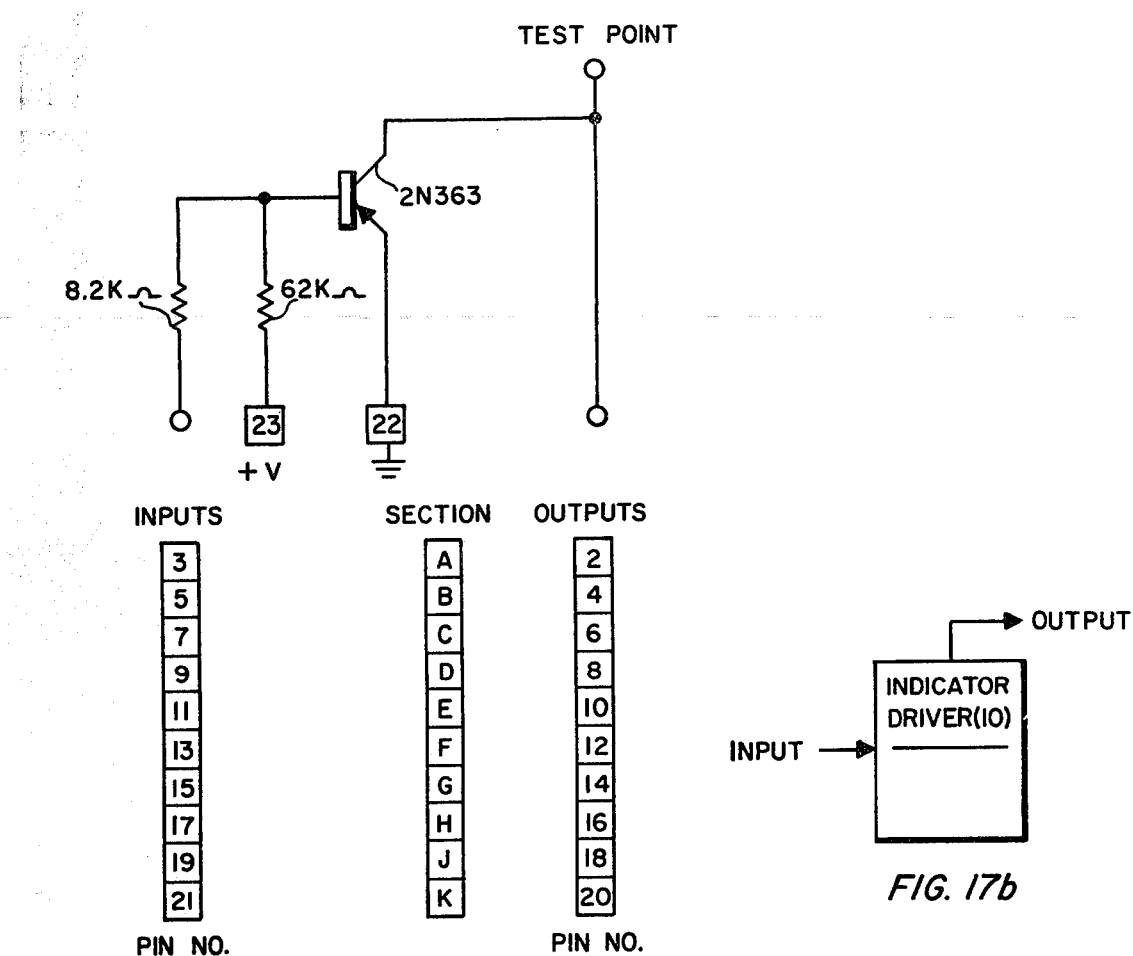
FIG. 17a
FIG. 17b
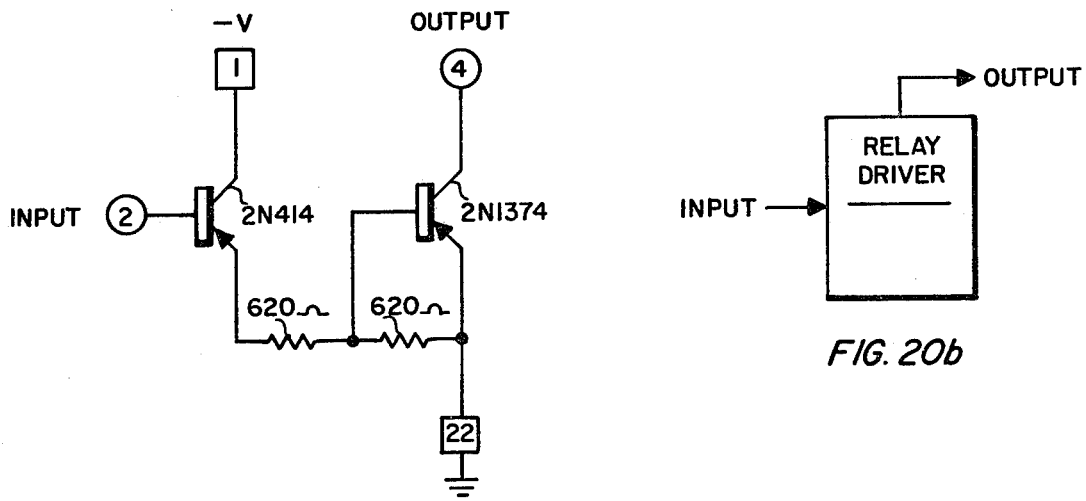
FIG. 20a
FIG. 20b

CHECKER AND AUTOMATIC SYNCHRONIZER FOR CODING EQUIPMENT

This invention relates to the control of coding equipment, which is equipment for encoding information at one station and decoding the same information at another station. It consists in general of two equipments. There is a Transmit Coding Equipment at a transmitting station which encodes information bearing signals from a Transmit Terminal Equipment of some kind at the transmitting end of a telephone line, radio link, or some other form of transmission line, so that the information is in the coded state when sent over the line or link and therefore appears unintelligible to anyone tapping in. At the receiving station is a Receive Coding Equipment which decodes the signals, so that they revert to their original intelligible state before activating the Receive Terminal Equipment. More particularly, this invention relates to a Checker and Automatic Synchronizer which monitors the synchronization of both coding equipments and resynchronizes them in the case of malfunctions in the system or in conformance with routine doctrinal procedures.

This application is related to application Ser. No. 153,542, filed Nov. 20, 1961 by Harold P. Belcher, Joseph A. Kersey and William G. Burke, Jr.

Today communication lines span the continents and spread over vast unpoliced areas affording ample opportunity to intercept messages. To keep confidential information out of unfriendly hands, various means of coding messages on the transmitting ends and decoding them on the receiving ends have been devised. The complexity of the coding associated with some of these devices requires elaborate methods of keeping the Transmit and Receive Coding Equipments in synchronization and resetting them when they go out of synchronization. When duplex lines are employed for two way communications, the complexity of the synchronizing procedure increases accordingly.

Of the more sophisticated coding equipments in present day coding which may be used as an example to illustrate a preferred embodiment of the present invention are devices developed by the Department of Defense and described in Department of Defense Manuals KAM-89/TSEC and KAM-90/TSEC. Although the specific embodiment described is tailored to operate with these devices, it should be understood that the invention may be practiced with other coding equipments by suitable modifications without departing from the spirit of the invention. These devices have been designed for use with both one way or simplex and two way or duplex communication lines and incorporate circuitry for monitoring the transmission on the line, for recognizing the occurrence of malfunctions and thereupon initiating an alarm indication, and for applying corrective action. In the use of these devices, elaborate doctrinary procedures to be performed by two operators, one at the transmitting station and one at the receiving station, have been set up to assure proper operation.

These include a check-out procedure for determining if the alarm indicating circuitry within the Transmit Coding Equipment is in proper working order as well as the ordinary procedure for starting and synchronizing the Transmit Coding Equipment with the Receive Coding Equipment and for recognizing and correcting malfunctions. When any of a number of possible malfunctions occur in the system's operation, the operators must repeat the check-out procedure in each instance. Since the two Coding Equipments are at separated locations, each step in procedure must be directed by the operator at the transmitting station to the operator at the receiving station by another channel of communication, generally a phone line, and the results reported back by the receiving station operator before taking the next step. As any one of these occurrences may happen at any time, the presence of an operator is required at each location and at all times which adds to the expense of the encoding operation, as well as introducing human errors and delays into the system by the omission or improper performance of the doctrinary procedures.

It is accordingly an object of this invention to provide an instrument for receiving transmitted signals from a remote station and automatically checking these signals.

It is a further object of this invention to provide an instrument for receiving transmitted signals from a remote station and for automatically initiating a corrective action on the system in response to the discovery of malfunctions.

It is a further object to provide an instrument for automatically initiating the monitoring and correction of malfunctions in coding equipment in a two way system without the use of additional communication channels other than the information channels between the Transmit and Receive Coding Equipments.

It is a still further object to provide an instrument which will perform automatically the manual operations performed by an operator in the operation of coding equipment.

These objects are accomplished in the present invention by a Checker and Automatic Synchronizer at each station. They are of two types depending upon whether the transmission is a two way, two channel system or a one way, one channel system. In the two way, two channel system, the Checker and Automatic Synchronizer which incorporates conventional digital computer circuitry in novel combination is connected to the controls and indicators of both the Transmit Coding Equipment and the Receive Coding Equipment at its station. The received data at one end of the loop is monitored by the Checker and Automatic Synchronizer at that end and it performs automatically the proper response to the monitored data. If corrective action is required, the Checker and Automatic Synchronizer at that station takes over control, resets the equipment and initiates a resynchronizing cycle by proper command signals to the Transmit Coding Equipment at that station. These signals are sent over the data channel to the second station where they are observed by the Checker and Automatic Synchronizer at the second station which recognizes that a resynchronizing command has been issued at the first station. It thereupon takes over control and resets the Transmit and Receive Coding Equipment at the second station and initiates a resynchronizing cycle by proper command signals to the Transmit Coding Equipment at the second station. These signals are sent over the other data channel to the Receive Coding Equipment to the first station where they are observed by the first Checker and Automatic Synchronizer. Subsequently, the return signals to the second station are observed by the Checker and Automatic Synchronizer at the second station. When both Checkers and Automatic Synchronizers verify the synchronization of the channels and the fact that there are no malfunctions in the system, they release control of the loop for the transmission of data between the two stations. Where a one way, one channel system is used, an auxiliary order wire is required to transmit command signals between stations in the opposite direction from the data channel. In the one way, one channel system the Checkers and Automatic Synchronizers are somewhat different than for the two way, two channel system but the overall functions are the same.

Other objects and features will be apparent and readily understood by reference to the following description and to the embodiments thereof as illustrated in the accompanying drawings wherein.

Figure 3:
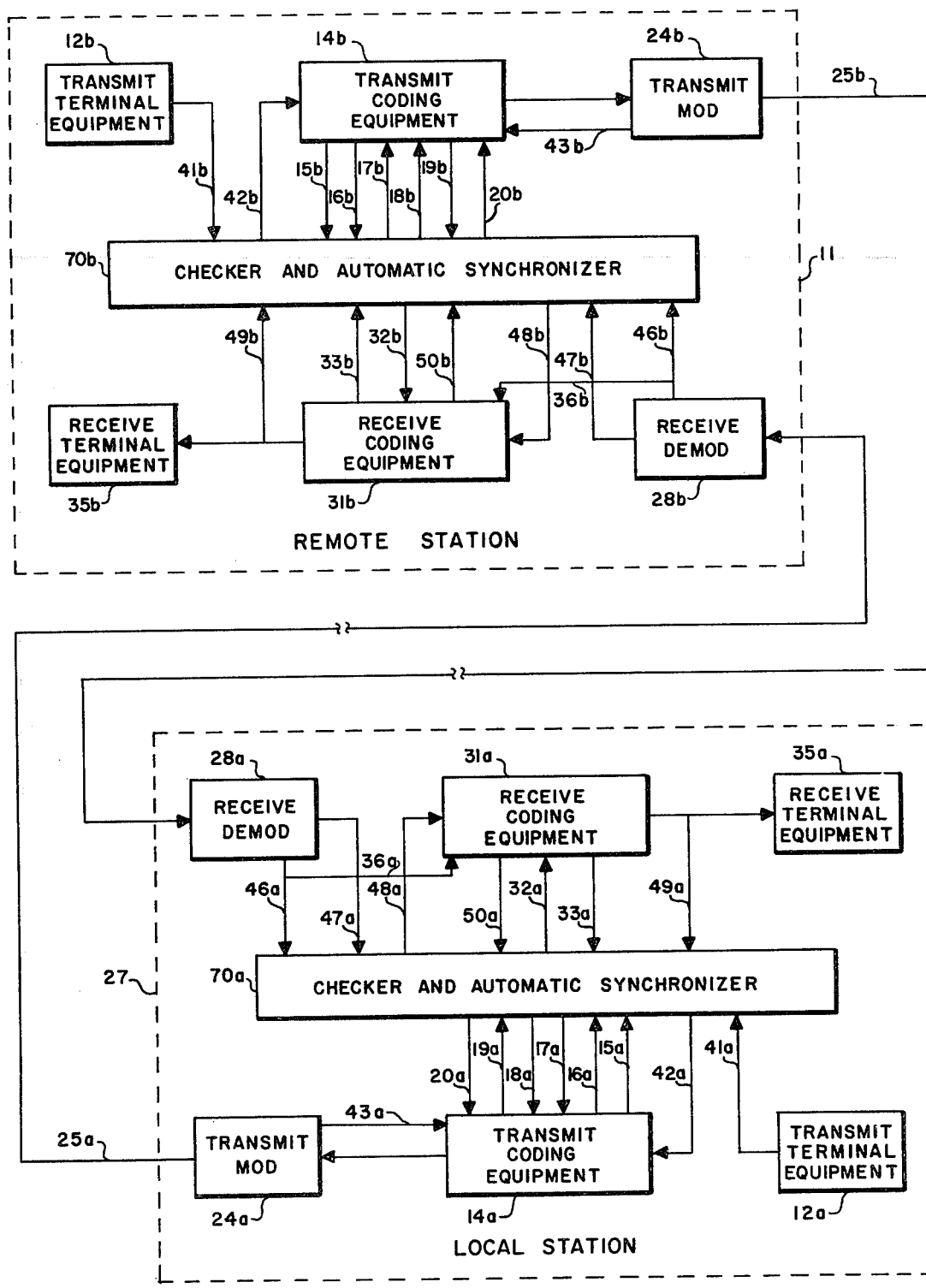
FIG. 3 is a block diagram of two systems of FIG. 1 employed as a two way transmission system by the use of two Checkers and Automatic Synchronizers of the present invention.
Figure 4A:
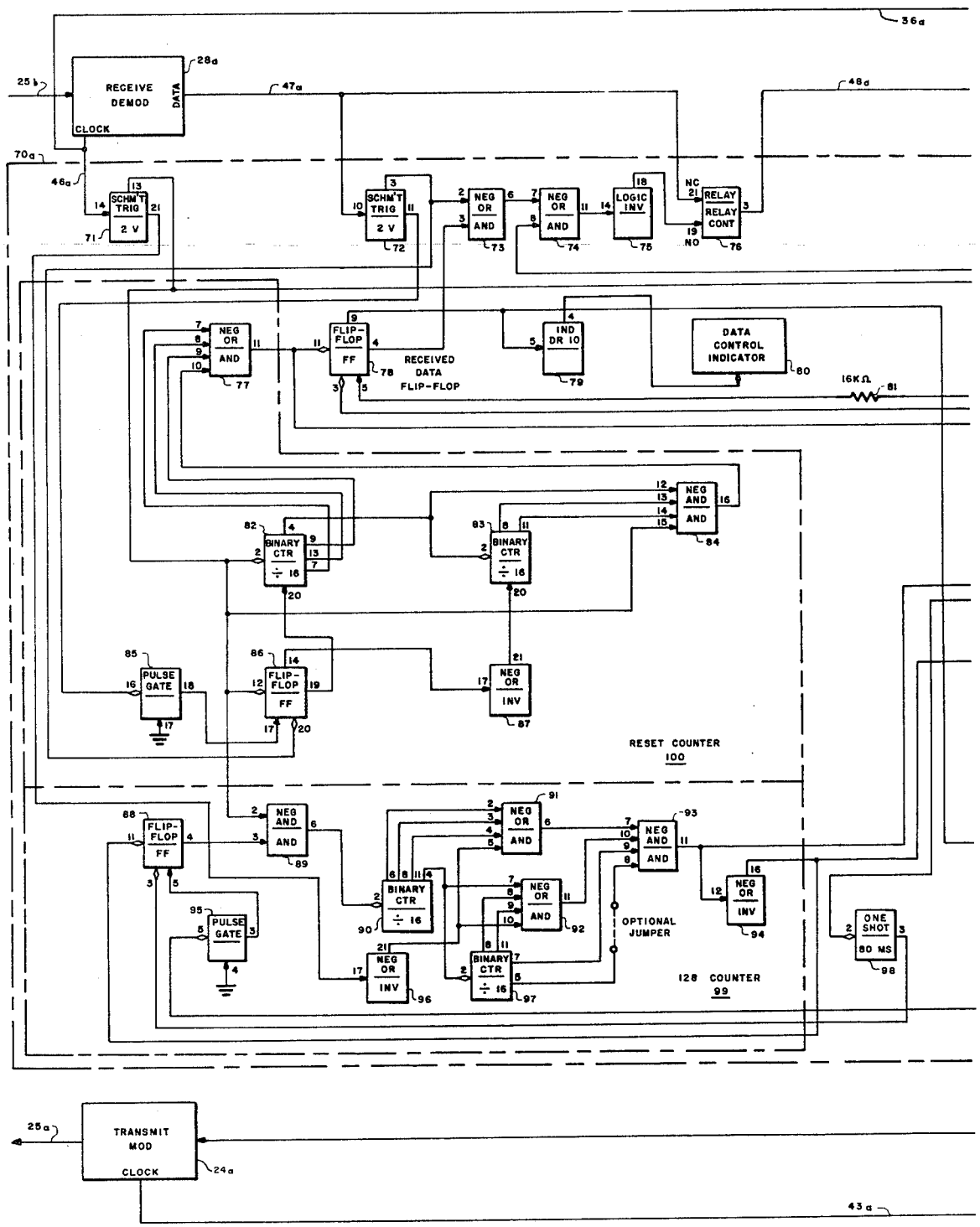
Figure 4B:
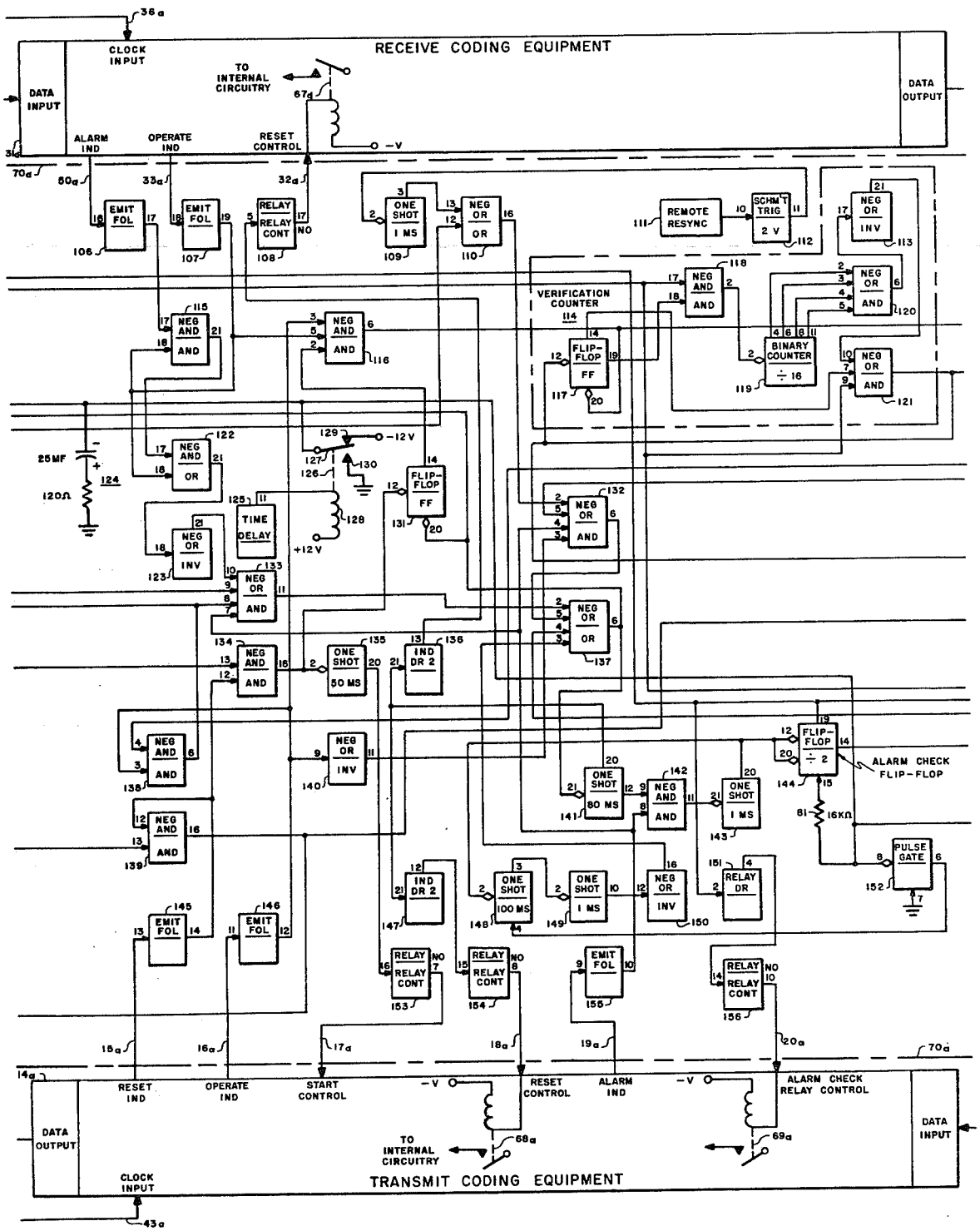
Figure 4C:
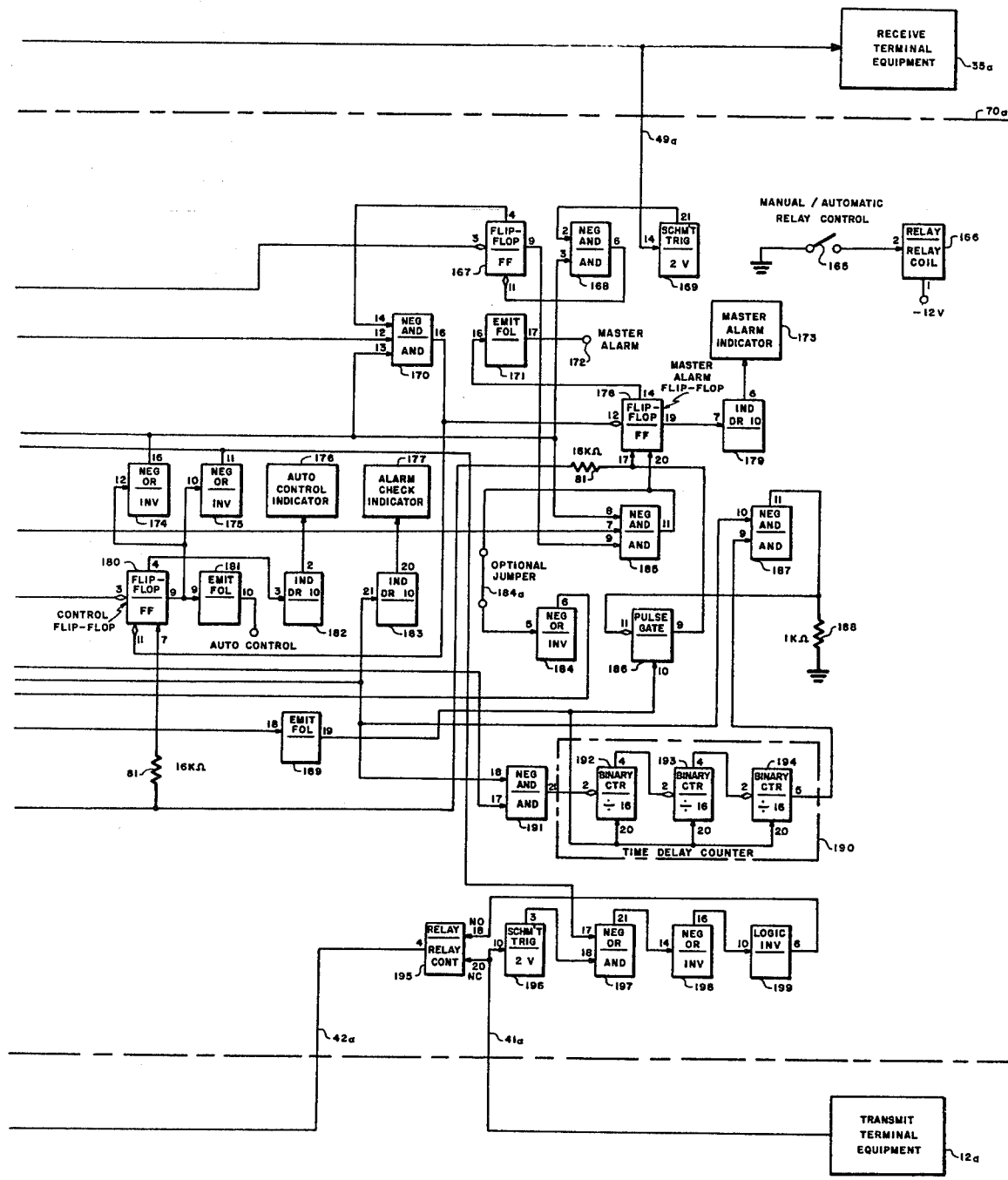

FIGS. 4a, 4b and 4c in combination is a logical digital symbolic diagram showing one of the two identical Checkers and Automatic Synchronizers of FIG. 3.

FIG. 5 is a diagram showing the method of identifying the circuitry of the functional blocks shown in FIGS. 4a, 4b and 4c.

FIG. 6 is a timing diagram of the Power Turn-On Sequence and Alarm Check Sequence.

FIG. 7 is a timing diagram of a complete synchronizing cycle.

FIG. 8a is a schematic diagram of the Dual One Shot Multivibrator shown in symbolic form in FIGS. 4a, 4b and 4c.

FIG. 8b is the symbolic representation of the circuit of FIG. 8a.

FIG. 9a is a schematic diagram of the Relay shown in symbolic form in FIGS. 4a, 4b and 4c.

FIG. 9b is the symbolic representation of the single pole, double throw relay contacts of FIG. 9a.

FIG. 9c is the symbolic representation of the single pole, single throw relay contacts of FIG. 9a.

FIG. 9d is the symbolic representation of the relay coil of FIG. 9a.

Figures 10A, 10B:
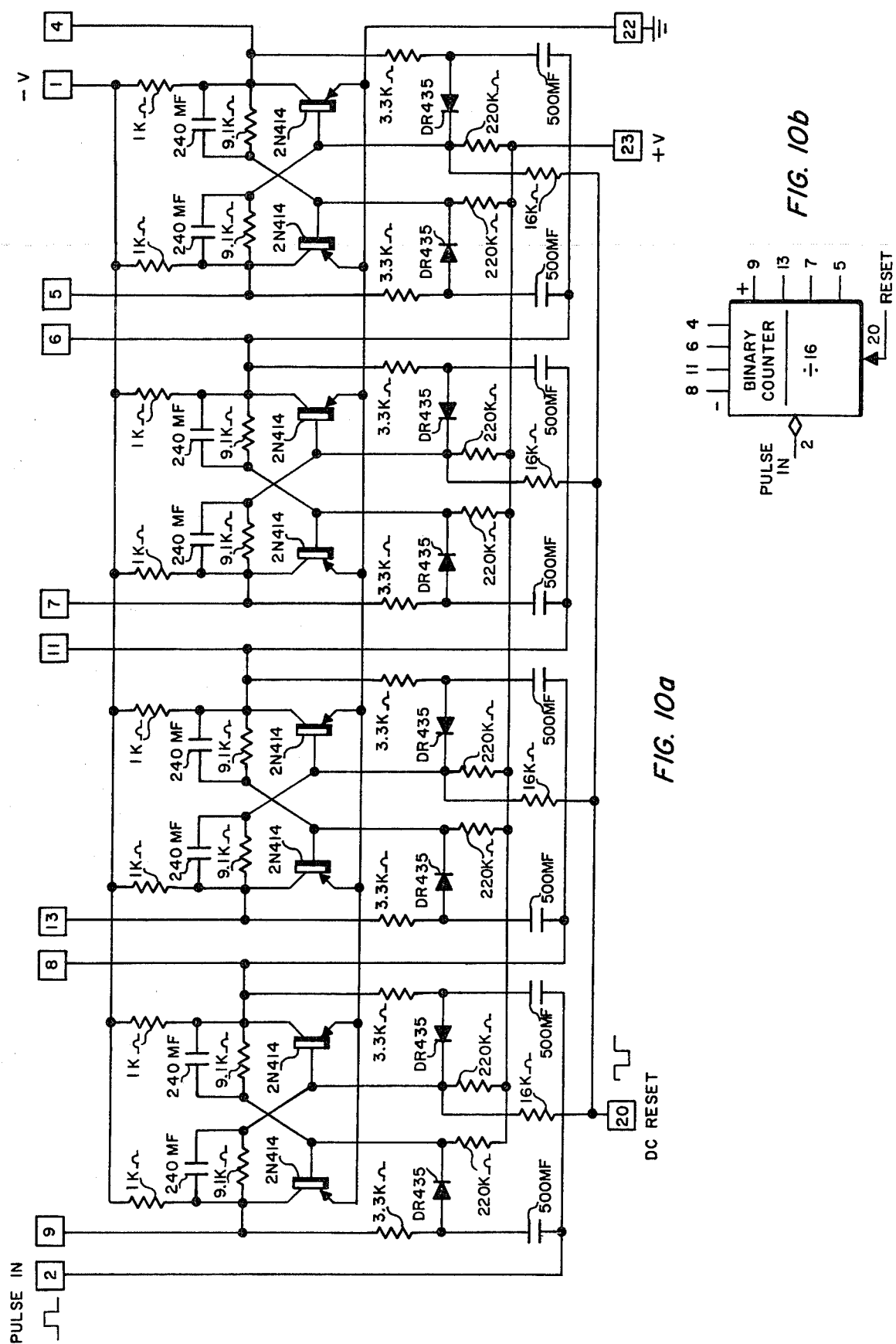

FIG. 10a is a schematic diagram of the Binary Counter shown in symbolic form in FIGS. 4a, 4b and 4c.

FIG. 10b is the symbolic representation of the Binary Counter of FIG. 10a.

FIG. 11a is a schematic diagram of the Emitter Follower shown in symbolic form in FIGS. 4a, 4b and 4c.

FIG. 11b is the symbolic representation of the Emitter Follower of FIG. 11a.

FIG. 12a is a schematic diagram of the Pulse Gate shown in symbolic form in FIGS. 4a, 4b and 4c.

FIG. 12b is the symbolic representation of the Pulse Gate of FIG. 12a.

FIG. 13a is a schematic diagram of the Flip-Flop shown in symbolic form in FIGS. 4a, 4b and 4c.

FIG. 13b is a symbolic representation of the Flip-Flop of FIG. 13a connected to a Set-Reset Flip-Flop.

FIG. 13c is the symbolic representation of the Flip-Flop of FIG. 13a connected as a Binary Flip-Flop.

Figures 14A, 14B:
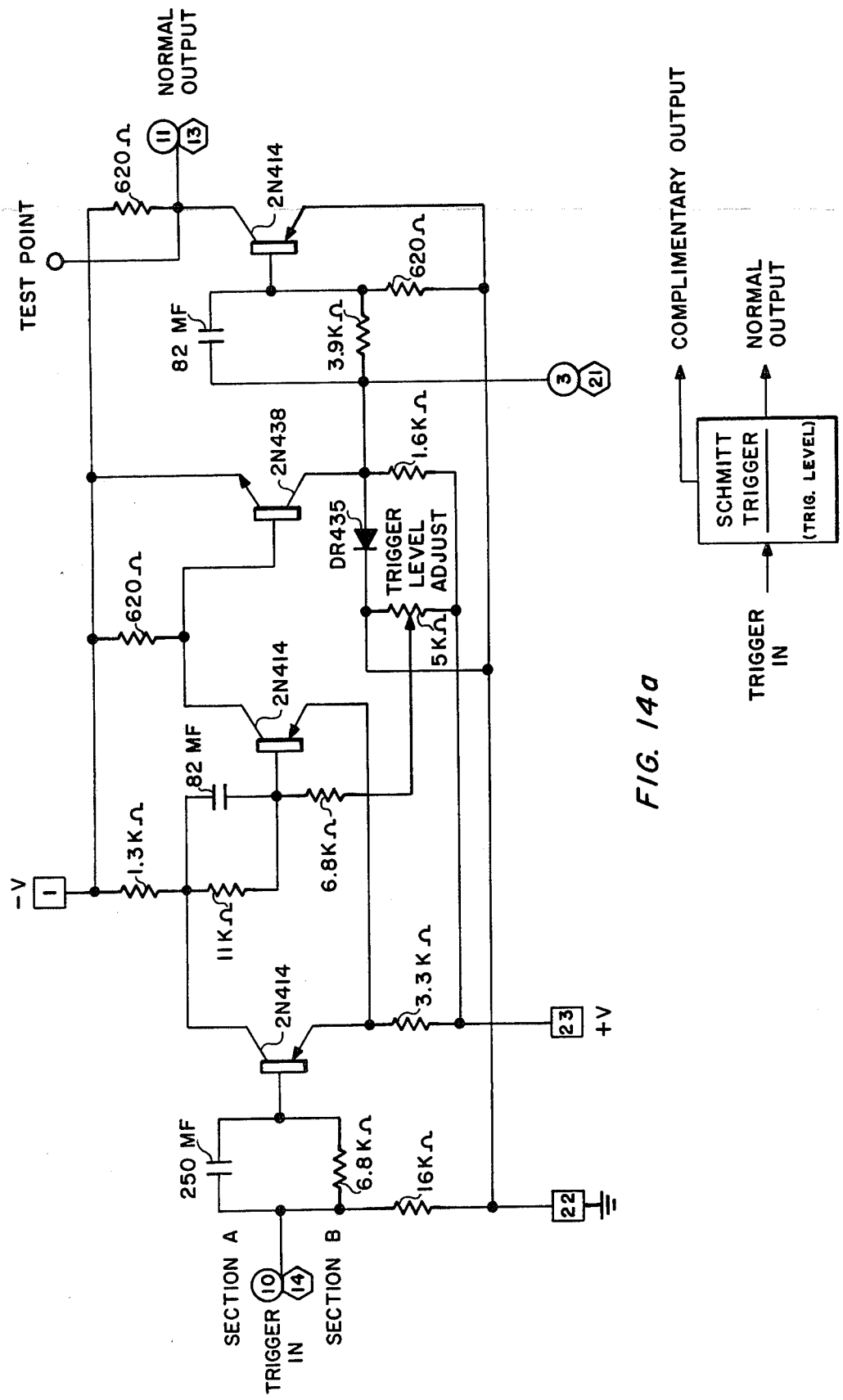

FIG. 14a is a schematic diagram of the Bi-Polar Schmitt Trigger shown in Symbolic form in FIGS. 4a, 4b and 4c.

FIG. 14b is the symbolic representation of the Schmitt Trigger of FIG. 14a.

Figure 15A:
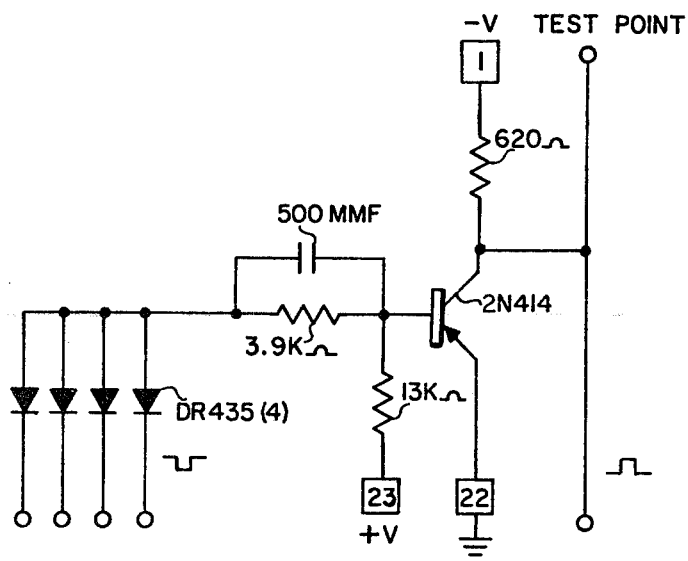

FIG. 15a is a schematic diagram of the Negative OR Inverter shown in symbolic form in FIGS. 4a, 4b and 4c.

Figure 15B:
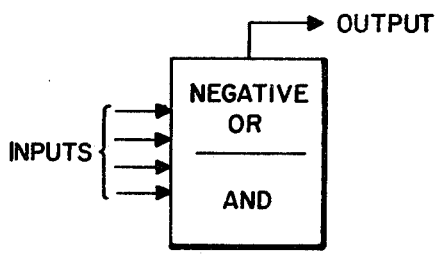

FIG. 15b is the symbolic representation of the circuit of FIG. 15a operating as an AND Gate.

Figure 15D:
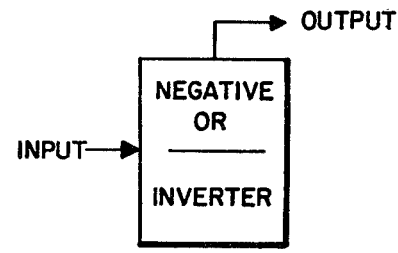
Figure 15C:
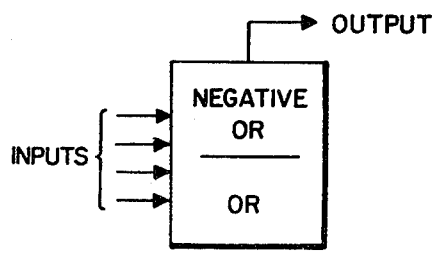

FIG. 15c is the symbolic representation of the circuit of FIG. 15a operating as an OR Gate.

FIG. 15d is the symbolic representation of the circuit of FIG. 15a operating as an Inverter.

Figure 16A:
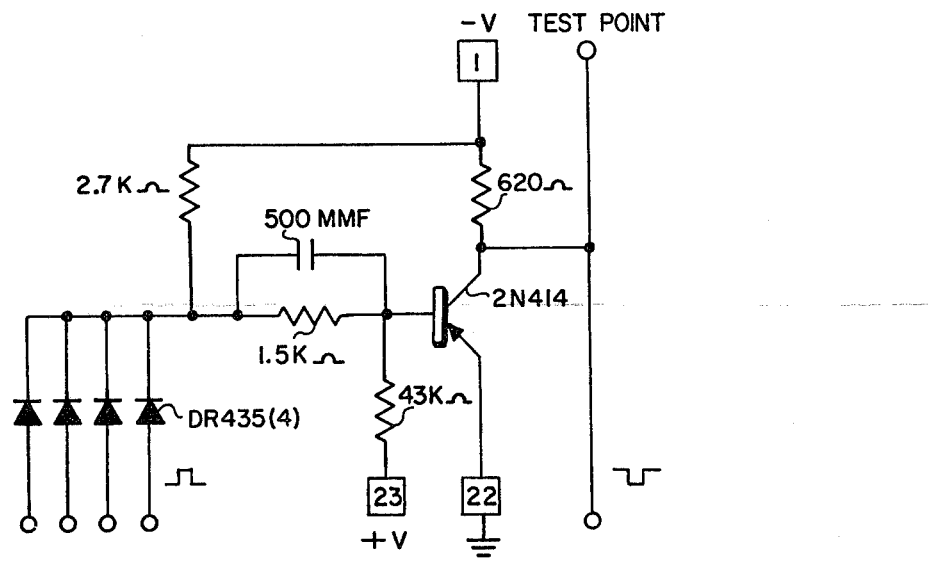

FIG. 16a is a schematic diagram of the Negative AND Inverter shown in symbolic form in FIGS. 4a, 4b and 4c.

Figure 16B:
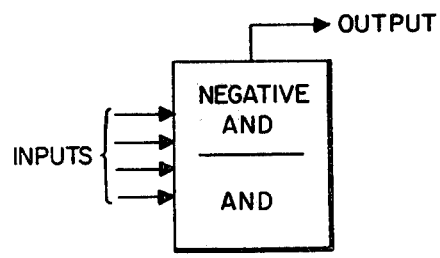

FIG. 16b is the symbolic representation of the circuit of FIG. 16a operating as an AND Gate.

Figure 16D:
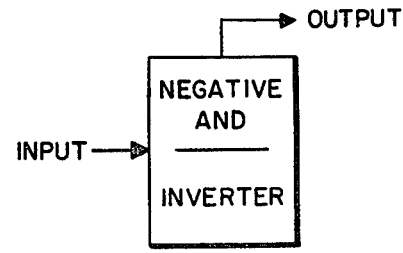
Figure 16C:
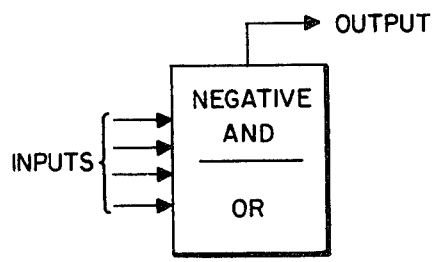

FIG. 16c is the symbolic representation of the circuit of FIG. 16a operating as an OR Gate.

FIG. 16d is the symbolic representation of the circuit of FIG. 16a operating as an Inverter.

FIG. 17a is a schematic diagram of the Indicator Driver (10) shown in symbolic form in FIGS. 4a, 4b and 4c.

FIG. 17b is the symbolic representation of the Indicator Driver (10) of FIG. 17a.

FIG. 18a is a schematic diagram of the Indicator Driver (2) shown in symbolic form in FIGS. 4a, 4b and 4c.

FIG. 18b is the symbolic representation of the Indicator Driver (2) of FIG. 18a.

FIG. 19a is a schematic diagram of the Time Delay shown in symbolic form in FIGS. 4a, 4b and 4c.

FIG. 19b is the symbolic representation of the Time Delay of FIG. 19a.

FIG. 20a is the schematic diagram of the Relay Driver shown in symbolic form in FIGS. 4a, 4b and 4c.

FIG. 20b is the symbolic representation of the Relay Driver of FIG. 20a.

FIG. 21a is a schematic diagram of the Logic Inverter shown in symbolic form in FIGS. 4a, 4b and 4c.

FIG. 21b is the symbolic representation of the Logic Inverter of FIG. 21a.

Figure 2:
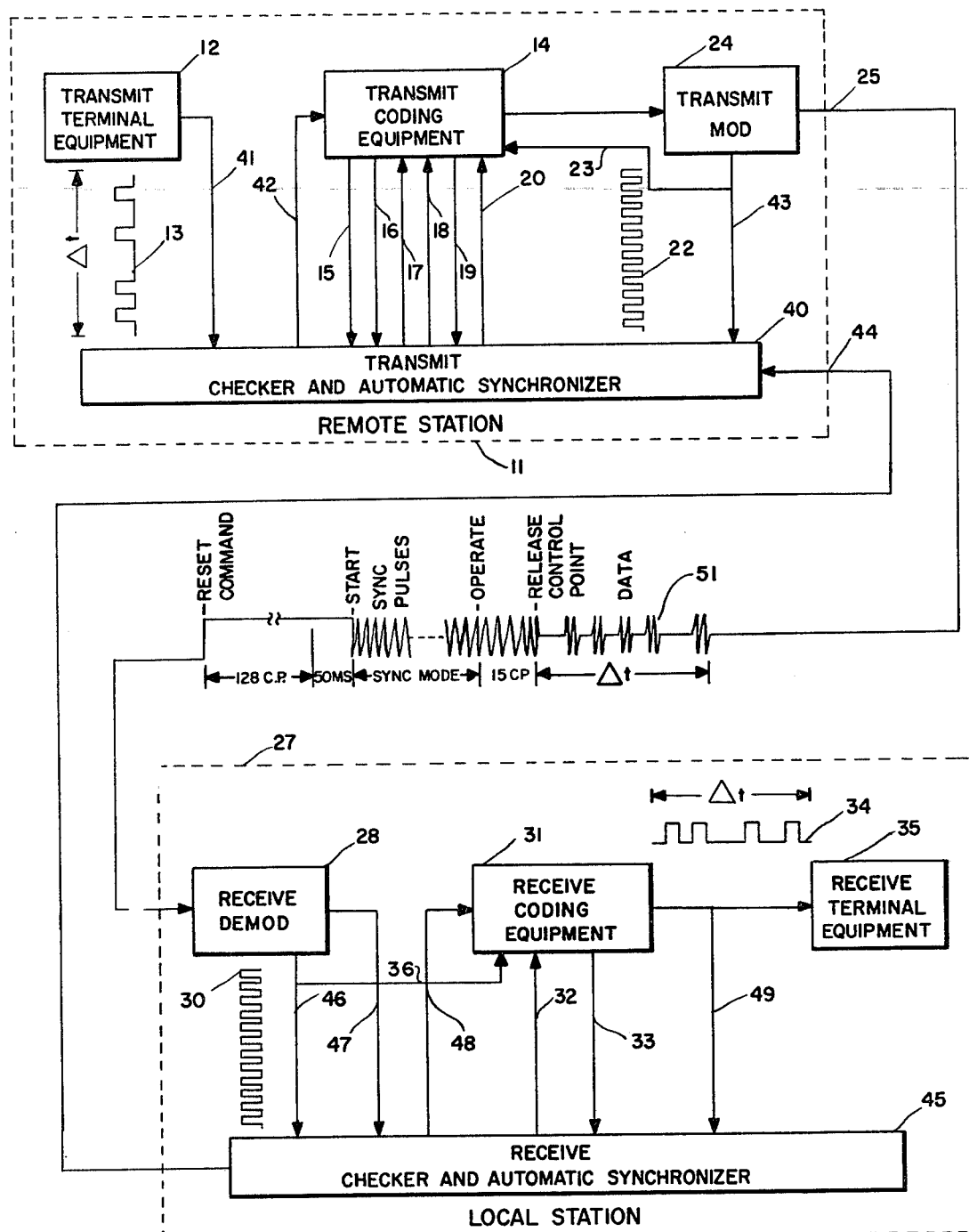
FIG. 2 is a block diagram of the one-way transmission system of FIG. 1 employing two Checkers and Automatic Synchronizers of the present invention.
Figure 22:
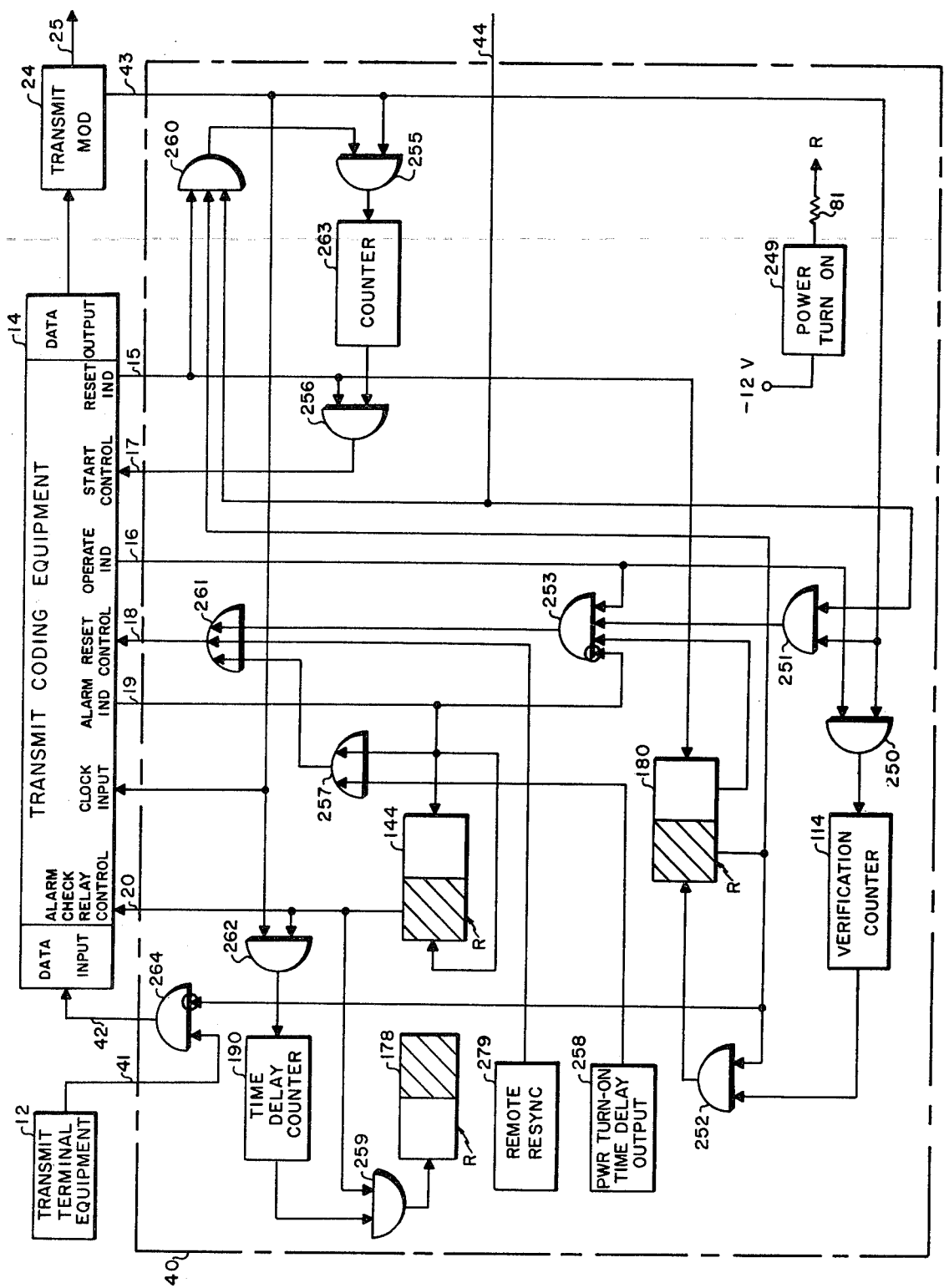

FIG. 22 is a logical digital symbolic diagram of Checker and Automatic Synchronizer (40) shown at the Remote Station (11) in the Simplex System of FIG. 2.

Figure 23:
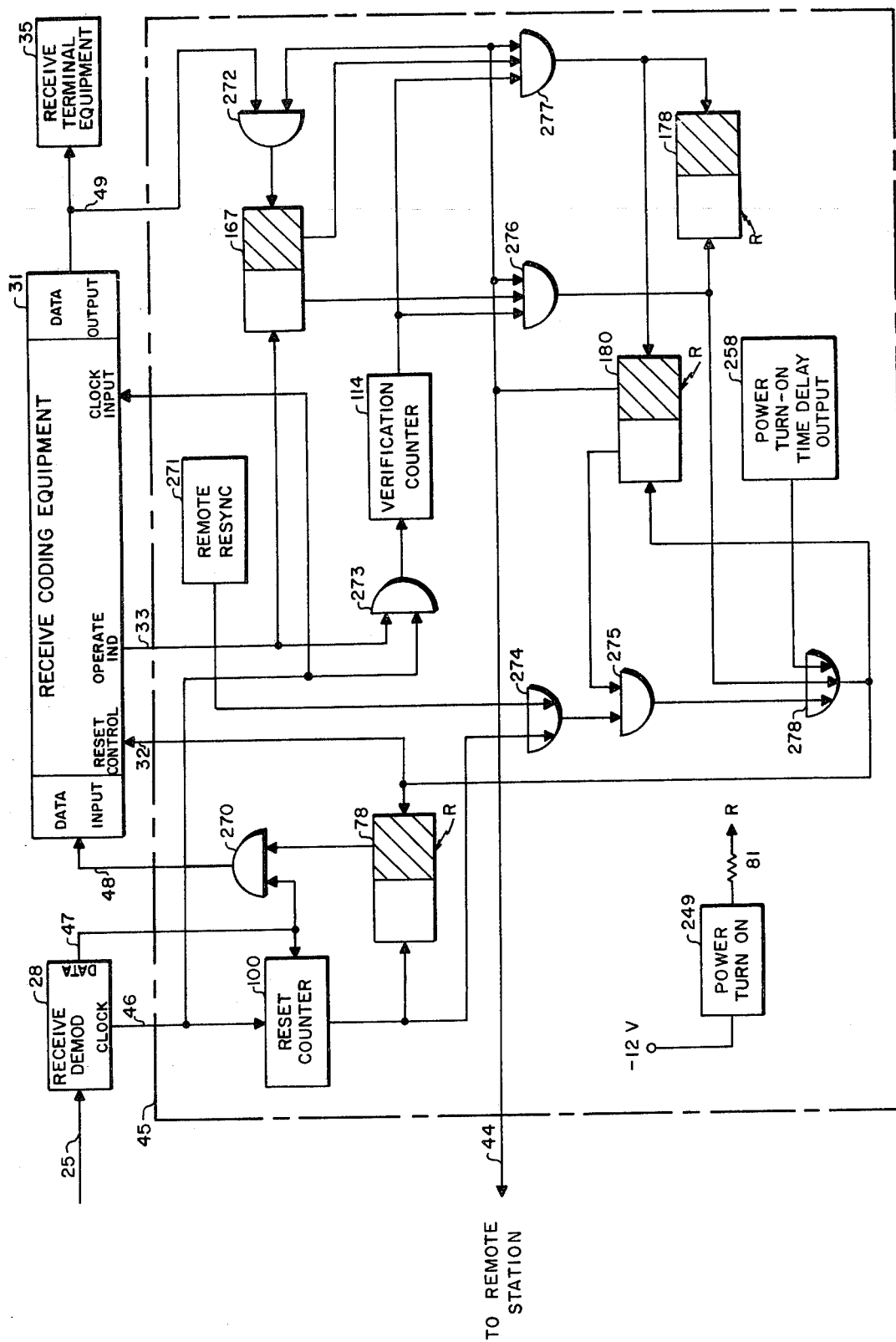

FIG. 23 is a logical digital symbolic diagram of Checker and Automatic Synchronizer (45) shown at the Local Station (27) in the Simplex System of FIG. 2.

Figure 24:
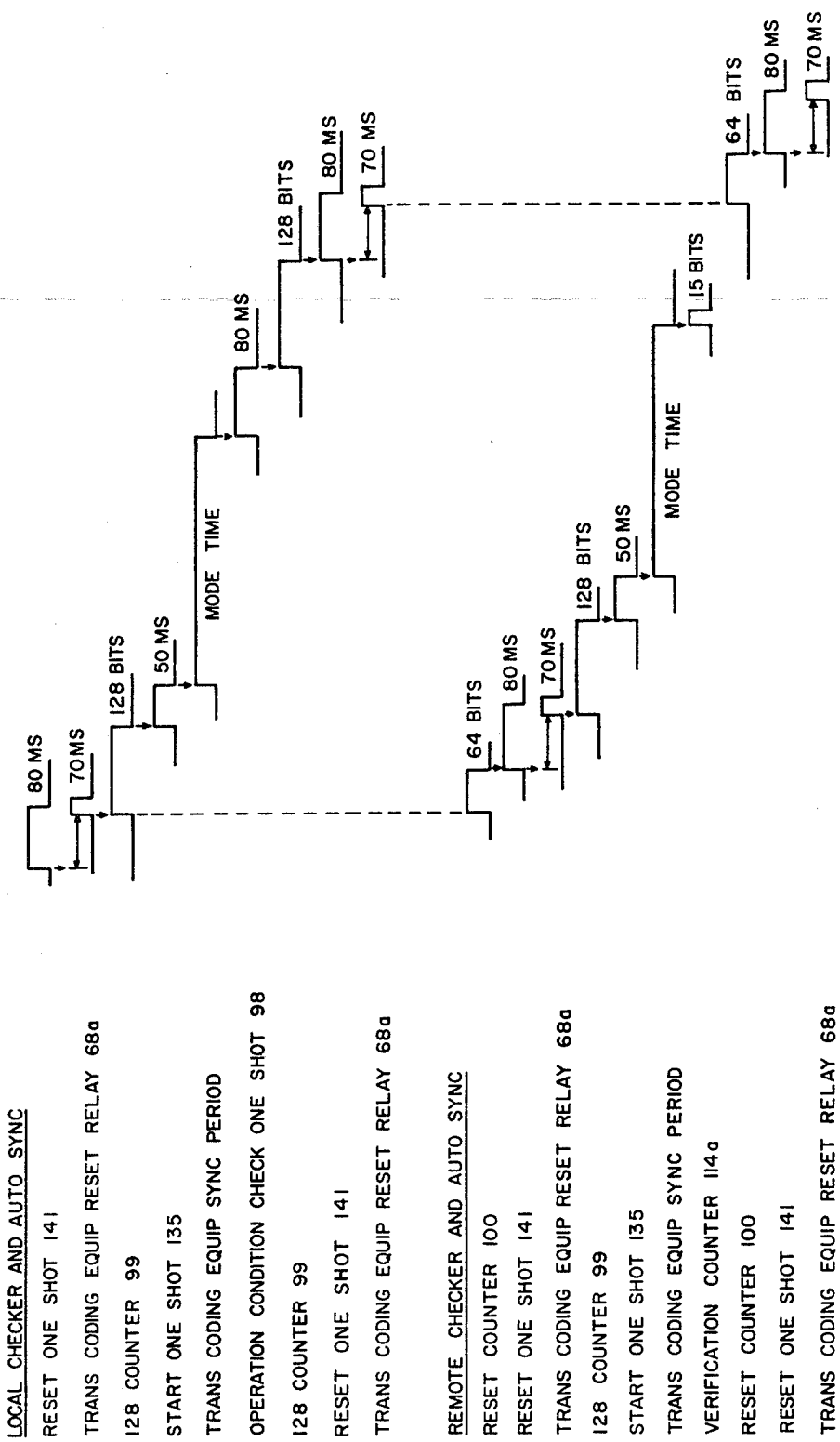

FIG. 24 is a timing diagram of one complete synchronizing cycle when synchronization is impossible, e.g., when a line break condition exists.

Figure 1:
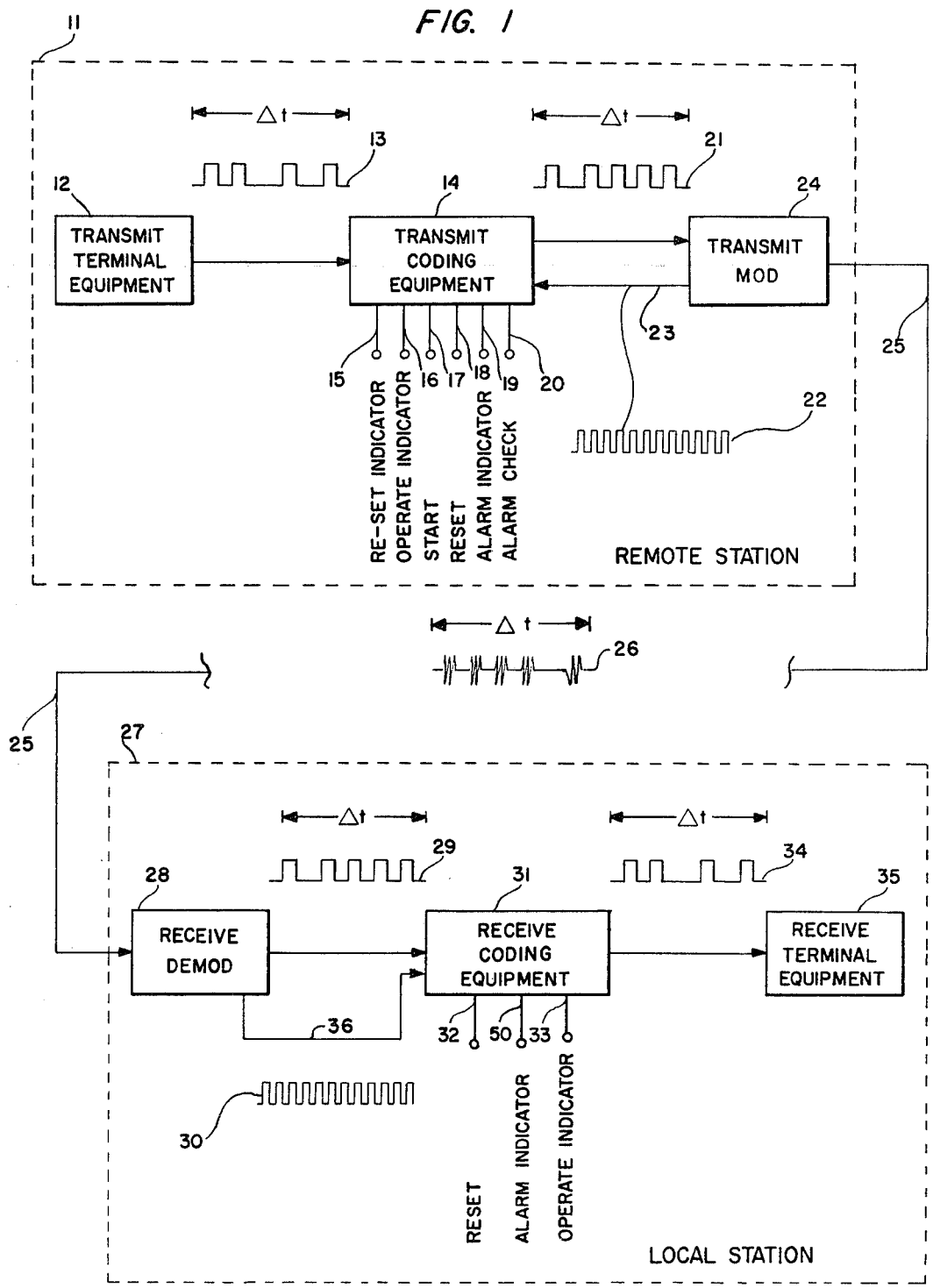
FIG. 1 is a block diagram illustrative of a typical one-way transmission system for encoding and decoding signals.

FIG. 1 in block diagram form illustrates a typical single channel one-way transmission system for generating, encoding, transmitting, decoding, receiving, and reading out signal information. The Transmit Terminal Equipment 12 and Receive Terminal Equipment 35 may be of any desired types or compatible transmitting and receiving combinations such as a high speed card reader and puncher, teletypewriters, facsimile devices, magnetic tape devices, paper tape devices, vocoders such as the Hughes Aircraft Corporation Vocoder HC-135, high speed printers, computers and other types. In the embodiment of FIG. 1, at remote station 11, Transmit Terminal Equipment 12 for example a Hughes Vocoder HC-135 is shown transmitting a certain number of bits of digital pulse data 13 within time interval $\Delta t$. A source of clock pulses is included in Transmit Terminating Equipment 12. This data is encoded in Transmit Coding Equipment 14, to the form shown at 21 within the same interval at time Δt, and after being modulated in Transmit Modulator 24 to the pulsed carrier form 26, leaves the remote station 11 and is sent over transmission line 25 to the local station 27 where it is received in Receive Demodulator 28. The data in carrier form on transmission line 25 is demodulated in Receive Demodulator 28 to the form shown at 29 and transmitted to Receive Coding Equipment 31, which in this embodiment is a receiving device described in Department of Defense Manuals KAM-89/TSEC and KAM-90/TSEC. Transmit Modulator 24 and Receive Demodulator 28 or any other clock sources also transmit clock pulses 22 and 30 as the time references to Transmit Coding Equipment 14 and Receive Coding Equipment 31 over lines 23 and 36 respectively. There are two clock pulses for every one digital pulse data bit. During normal transmission, the demodulated encoded digital pulse data passes through the Receive Coding Equipment 31 where it is decoded to the form 34 which is identical to the original data at 13. The decoded digital pulse data 34 enters Receive Terminal Equipment 35 where it is read out in punched card form to an observer.

To avoid any ambiguity in the foregoing description, it should be noted that the wave shapes illustrated in FIG. 1 represent the same data at different times as it travels along the line, and Δt represents one interval of time, that is the interval required for the generation by the Transmit Terminal Equipment 12 of the number of bits of data selected for illustration.

Obviously, the successful operation of the system and the fidelity of the transmission illustrated in FIG. 1 depends upon the accuracy of synchronization between Transmit Coding Equipment 14 and Receive Coding Equipment 31 so that the decoded data 34 from the Receive Coding Equipment 31 is the same as the digital data 13 encoded by the Transmit Coding Equipment 14. This is accomplished in a number of specific ways depending upon the particular coding equipment employed, but fundamentally all types including the devices described in the aforementioned Department of Defense Manuals and used to illustrate the present embodiment work in the same manner. Each coding equipment operates electrically on its input signal by some encoding or decoding function of time, depending upon whether it is a transmit or receive coding equipment, to produce the coded or decoded voltage output respectively. The coding and decoding time functions are reciprocals. However, as the signal transmit time from the remote to the local station is not instantaneous, the encoding time function must be delayed with respect to the instantaneous reciprocal coincidence point in the decoding time function by this signal transmit time for the receive coding equipment output to reproduce the transmit coding equipment input. Of course, any phase shift effect of the line must also be accounted for. When the words "synchronizer", "synchronization", or their equivalents are used in this specification and claims, this is the condition referred to.

Each coding equipment includes means for resetting the encoding and decoding function of time circuitry to its respective equivalent synchronization point with respect to the companion equipment upon proper initiation. When the circuitry is reset and synchronizing pulses are then in turn transmitted from Transmit Coding Equipment 14 to Receive Coding Equipment 31 after being modulated and demodulated in Transmit Modulator 24 and Receive Demodulator 28 respectively, they are detected and compared with the frequency standard for that instant of time. If there is pulse coincidence with that standard then the Receive Coding Equipment 31 indicates that it is in synchronism with the Transmit Coding Equipment 14 and the system is ready for operation.

In order to obtain a proper understanding and appreciation of the present invention, it is desirable to become familiar with the Operator's present procedure for putting the system of FIG. 1 into operation manually.

The Transmit Coding Equipment 14 includes circuitry which activates an alarm when certain malfunctions in the encoding operation show up. To ascertain that this circuitry is in proper working order, a routine doctrinary procedure, the so-called Alarm Check cycle, is performed to check out the alarm indicating circuitry.

Since the Operator operates the controls under the stimuli of the indicators external to the Transmit Coding Equipment 14, six electrical lines terminating externally in switches or indicators are shown on the Transmit Coding Equipment 14. The switches and indicators and energizing sources themselves are not shown in FIG. 1 but only the lines to which they are connected.

Reset line 18 terminates in a Reset Switch and when the line is energized by switching power to it, it resets the internal circuitry of the Transmit Coding Equipment to its respective beginning of synchronization point and prepares for the start of the synchronizing procedure.

In this description the generic term "Reset" is used throughout. However, it should be understood that in the devices used to illustrate a preferred embodiment of the present invention, i.e., those described in the Department of Defense Manuals KAM-89/TSEC and KAM-90/TSEC, the term "PREP" which is short for preparatory is used to describe the reset function.

Reset Indicator line 15 terminates in a reset indicator which is energized when the internal circuitry is in the reset state. Start line 17 terminates in the Start Switch and when the line is properly energized by switching power to it, it triggers the Transmit Coding Equipment into transmitting synchronizing pulses. Alarm Check line 20 terminates in the operate-alarm check switch. The alarm check position acts to energize line 20 by switching power to it to put the Transmit Coding Equipment in the Alarm Check cycle. Alarm Indicator line 19 terminates in an alarm indicator which is internally energized when the circuitry within the Transmit Coding Equipment 14 indicates an alarm or at the successful conclusion of an Alarm Check cycle when everything is in working order within the Transmit Coding Equipment. During the Alarm Check cycle intentional malfunctions are fed into the Transmit Coding Equipment 14. If the Transmit Coding Equipment Alarm indicating circuitry is working properly, the Alarm Indicator line 19 will be energized and the Alarm Indicator will go on. If the circuitry is not working properly, the Alarm indicator will not go on. During the Alarm Check cycle nothing can get out of Transmit Coding Equipment 14. In the operate position of the operate-alarm check switch, Alarm Check line 19 is de-energized and the block is removed from the output of Transmit Coding Equipment 14. Line 16 terminates in an operate indicator which in the operate position is internally energized within the Transmit Coding Equipment 14 when the Receive Coding Equipment 31 is in synchronism with the Transmit Coding Equipment and is also energized in the Alarm Check position at the successful conclusion of an Alarm Check cycle just before the Alarm Indicator line 19 is energized. Actually the Coding Equipments used are transceivers and there is a seventh electrical line terminating in a Receive-Transmit switch, but this is not necessary to a proper understanding of the invention and is not shown.

An Alarm Check is required to be initiated by the operator on the Transmit Coding Equipment 14 under any one of the following conditions:

1. Upon initially switching on power;
2. The presence of an alarm in the circuit; (This is brought to the attention of the Operator by energization of the Alarm Indicator line 19 (Alarm indicator goes on)).
3. Upon switching a coding equipment from "Receive" to "Transmit"; (Coding Equipments are sometimes transceivers).

The sequence of events for the Operator at the remote station 11 in performing an Alarm Check on the Transmit Coding Equipment 14 is as follows:

1. Place transmitter in alarm check cycle of operation by turning the operate-alarm check switch to the "Alarm Check" position.
2. Reset the internal circuits with the Reset Switch after which the Reset Indicator line 15 is energized.
3. Start the transmitter with the Start Switch which initiates synchronizing pulses within the Transmit Coding Equipment 14. These pulses, however, are blocked from getting out of the Transmit Coding Equipment with the operate-alarm check switch in Alarm Check position. When Start line 17 is energized, Reset Indicator line 15 is de-energized.
4. Wait for the Transmit Coding Equipment Operate and Alarm Indicators to light up with the equipment in the Alarm Check cycle, if the internal alarm indicating circuitry is functioning properly, the Operate Indicator will turn on followed immediately by the Alarm Indicator a short period of time after Start line 17 is energized by the Start Switch.

It should be noted that there is no positive indication of a malfunction in the alarm indicating circuitry. If a malfunction is present, the operate and alarm indicators will not come on. Hence, after waiting the normal period of time for the two indicators to come on without them doing so, the operator judges that there is trouble in the circuitry and initiates corrective action.

If the Operate and Alarm Indicators on the Transmit Coding Equipment 14 go on indicating that the Alarm indicating circuitry is operating properly, the Operator at the remote station 11 proceeds to synchronize the Transmit Coding Equipment 14 with the Receive Coding Equipment 31 in the following manner.

1. Put the Transmit Coding Equipment 14 in the normal "operate" mode by turning the operate-alarm check switch to the "Operate" position and then resets the Transmit Coding Equipment 14 by energizing Reset line 18 with the Reset Switch, not shown. By energizing this switch, Reset Indicator line 15 is energized.
2. The Remote Operator then directs the local Operator to reset the Receive Coding Equipment 31 internal circuits with the Reset Switch which energizes Reset line 32.
3. Start the Transmit Coding Equipment 14 by energizing Start line 17 with the Start Switch which sends synchronizing pulses over the line 25 to the Receive Coding Equipment 31. After a short delay the Operate Indicator line 16 is energized and the operate indicator goes on in the Transmit Coding Equipment 14 simultaneously with the energizing of the Operate Indicator line 33 and the operate indicator in the Receive Coding Equipment 31. The Operator at the local station 27 reports this to the Operator at the remote station 11 and the remote station Operator cuts the Transmit Terminal Equipment 12 into the line while the local station Operator cuts the Receive Terminal Equipment 35 into the line. The system of FIG. 1 is then in full operation. If the two Coding Equipments do not come into synchronism, then the Receive Terminal Equipment 35 gives unintelligible information indicating a false start and this is reported back to the Operator at the local station, after which the procedure is repeated until the two Coding Equipments come into synchronism.

FIG. 2 shows the one way or simplex system of FIG. 1 adapted for automatic operation by the employement of a Transmit Checker and Automatic Synchronizer 40 at the remote station 11 and a Receive Checker and Automatic Synchronizer 45 at the local station 27. In this system the Reset Indicator line 15, the Operate Indicator line 16, the Alarm Indicator line 19, and the Operate Indicator line 33 are connected to indicators, not shown, to indicate the internal condition of the respective Coding Equipments and would normally provide the stimuli for the Operator's actions are brought out and connected to the respective Checker and Automatic Synchronizer, as are also the lines connected to switches, i.e., Start line 17, Reset line 18, Alarm Check line 20 and Reset line 32. After power is turned on and when as a result thereof and of subsequent actions, the indicator lines are energized by the internal conditions within the Coding Equipments, they in turn energize circuitry within the respective Checker and Automatic Synchronizer which automatically makes the proper switching response. The directions normally given by telephone from the Operator at the remote transmitting station 11 to the Operator at the local receiving station 27 are now automatically transmitted in the form of command pulses over the regular data transmission channel 25. The Receive Checker and Automatic Synchronizer 45 observes the incoming transmission, and what would normally be telephoned responses from the Operator at the local station are now the signals themselves automatically transmitted from various points in the receiving system through the Receive Checker and Automatic Synchronizer 45 and over the auxillary line 44 to and through Transmit Checker and Automatic Synchronizer 40 to Transmit Coding Equipment 14 to control the transmission.

The functional blocks illustrated in FIG. 2 have the same function as the corresponding functional blocks of FIG. 1 and bear the same identification numbers. Digital data 13 from Transmit Terminal Equipment 12 is transmitted over line 41 to Transmit Checker and Automatic Synchronizer 40 where it is held pending an automatic determination that Receive Coding Equipment 31 is in synchronism with Transmit Coding Equipment 14 before being allowed to pass to the Transmit Coding Equipment over line 42.

The six electrical lines 15, 16, 17, 18, 19 and 20 of Transmit Coding Equipment 14 are connected to Transmit Checker and Automatic Synchronizer 40. Transmit Modulator 24 sends clock pulses 22 to Transmit Checker and Automatic Synchronizer 40 over line 43 and to Transmit Coding Equipment 14 over line 23. Line 25 connects Transmit Modulator 24 to Receive Demodulator 28 as before, but the demodulated output of Receive Demodulator 28 goes to Receive Checker and Automatic Synchronizer 45 over line 47 where it is gated off from passing to Receive Coding Equipment 31 until an automatic determination is made that the Transmit Coding Equipment 14 is in the process of being synchronized. Receive Demodulator 28 sends clock pulses 30 to Receive Checker and Automatic Synchronizer 45 over line 46 and to Receive Coding Equipment 31 over line 36. The electrical lines 32 and 33 of Receive Coding Equipment 31 are connected to Receive Checker and Automatic Synchronizer 45.

The output of Receive Coding Equipment 31 is sampled by Receive Checker and Automatic Synchronizer 45 over line 49. During the period of time while the Transmit Equipment 12 is cut off from the line and in which Transmit Coding Equipment 14 is transmitting synchronizing pulses over lines 25, 47 and 48 to Receive Coding Equipment 31 and after the Operate Indicators in both coding equipments go on there should be no output from the Receive Coding Equipment and consequently none on sampling line 49 if both Coding Equipments are properly synchronized. If this is the case, Transmit Checker and Automatic Synchronizer 40 releases control of the transmitting parts of the system to Transmit Terminal Equipment 12. If there is an output on sampling line 49 during the period of time, it indicates that the two Coding Equipments are out of synchronism and the output will energize a master alarm, not shown, and activate circuitry within Receive Checker and Automatic Synchronizer 45 which will reset the internal circuitry within Receive Coding Equipment 31 over line 32 and will send a signal over wire 44 to Transmit Checker and Automatic Synchronizer 40 which in turn will attempt to resynchronize the two Coding Equipments by energizing Reset and Start lines 18 and 17 respectively in turn. If the two Coding Equipments then become synchronized this time around, so that there is no output on line 49, then the master alarm will be turned off and control relinquished to the two Terminal Equipments. So long as an output on line 49 indicates that the two Coding Equipments remain out of synchronism at the conclusion of each resynchronizing cycle, the Master Alarm will remain on and the two Checkers and Automatic Synchronizers will continue to attempt to resynchronize the Coding Equipments. The wave shapes 51 appearing on line 25 at successive instants of time during a complete synchronizing or Reset-Start Sequence are illustrated in FIG. 2.

FIG. 3 shows a block diagram of two systems of FIG. 1 adapted for automatic two way or duplex operation by the employment of two identical Checkers and Automatic Synchronizers 70a and 70b at the Local Station 27 and the Remote Station 11 respectively. Each Checker and Automatic Synchronizer now services both a transmitting system and a receiving system at one station instead of either one as in the one way or simplex system of FIG. 2. The connections to both transmitting and receiving systems at one station are brought out to the Checker and Automatic Synchronizer at that station and the numbers represent the same connections as shown in and described for FIG. 2, except that the subscript "a" refers to equipment at the Local Station 27 and the subscript "b" refers to equipment at the Remote Station 11. With such two way operation the auxillary wire 44 of FIG. 2 is not required to report the condition of the Receive Coding Equipments 31a and 31b to the respective transmitters 14b and 14a because the regular information channels 25b and 25a are used on a time sharing basis for this purpose. The condition of Receive Coding Equipment 31a is carried through the Checker and Automatic Synchronizer 70a at the Local Station 27 to the Transmit Coding Equipment 14a at the Local Station and then is transmitted over information channel 25a to Receive Coding Equipment 31b at the Remote Station 11. This information is then monitored by and passes through the Checker and Automatic Synchronizer 70b to Transmit Coding Equipment 14b at the Remote Station 11 to control the transmission of the Transmit Coding Equipment 14b back over line 25b to the Checker and Automatic Synchronizer 70a, which information is monitored in turn before it is passed along to Receive Coding Equipment 31a at Local Station 27.

FIGS. 4a, 4b and 4c in combination shows in logical symbolic diagram form Checker and Automatic Synchronizer 70a at the Local Station 11 with the equipment at that station shown in FIG. 3. Checker and Automatic Synchronizer 70a is connected at one end to Receive Demodulator 28a from which it receives clock pulses over line 46a and the demodulated output over line 47a. The demodulated output passes through Checker and Automatic Synchronizer 70a to the input of Receive Coding Equipment 31a over line 48a. Receive Coding Equipment 31a also has its Reset line 32a, Operate Indicator line 33a and Alarm Indicator line 50a connected to Checker and Automatic Synchronizer 70a. The output of Receive Coding Equipment 31a is sampled by Checker and Automatic Synchronizer 70a over line 49a. Checker and Automatic Synchronizer 70a is connected at its other end to Reset Indicator line 15a, Operate Indicator Line 16a, Start line 17a, Reset Line 18a, Alarm Indicator Line 19a and Alarm Check Line 20a of Transmit Coding Equipment 14a, and receives the output of Transmit Terminal Equipment 12a on line 41a. This output passes through Checker and Automatic Synchronizer 70a to the input of Transmit Coding Equipment 14a on line 42a.

Checker and Automatic Synchronizer 70a comprises a network of digital circuitry and has been designed in accordance with so-called modular construction. In the present physical embodiment, the Checker and Automatic Synchronizer module is made up of a master connector board wih plug-in logic cards. The cards utilize static logic and incorporate solid state devices in their construction. Printed circuitry is used throughout. Each card contains one or more independent circuits or sections for performing an electrical function and is usually terminated in a 23 pin printed circuit connector which plugs into the master connector board.

To facilitate an understanding of the operation of the system, Checker and Automatic Synchronizer 70a at the local station 27 is shown in functional block diagrams in FIGS. 4a, 4b and 4c. An identical functional block diagram except for reversal from top to bottom would be at the Remote Station 11, but is not shown. Each block represents a separate circuit or section of a logic card.

FIG. 5 illustrates the scheme used for identifying the circuitry of each functional block shown in FIGS. 4a, 4b, 4c. With the card type obtained from FIGS. 4a, 4b, and 4c, the individual circuitry can be obtained by looking at the schematic diagram for that particular card type which is shown in one of FIGS. 9 through 21.

Returning to FIGS. 4a, 4b and 4c, the operation of Checker and Automatic Synchronizer 70a will be described by describing the operation of the various sequences which are initiated by conditions occurring at various times within the system.

The system can be operated manually or automatically by selection of the proper position of Manual-/Automatic Relay Control 165. Relay Control 165 connects the −12 volt supply through Relay Coil 166 to ground. When the switch is open in the Manual position, data bypasses Checker and Automatic Synchronizer 70a and passes directly from Receive Demodulator 28a to Receive Coding Equipment 31a through normally closed contact 21 of Relay contact 76 and from Transmit Terminal Equipment 12a to Transmit Coding Equipment 14a through normally closed contact 20 of Relay Contact 195. When Relay Control 165 is switched to the Automatic or closed position, Relay Coil 166 pulls in and data is diverted from Receive Demodulator 28a and Transmit Terminal Equipment 12a to Checker and Automatic Synchronizer 70a by the opening of normally closed contact 21 of Relay Contact 76 and the closing of normally open contact 19 and the opening of normally closed contact 20 of Relay Contact 195 and the closing of normally open contact 18. At the same time Relay contacts 108, 153, 154 and 156 close.

POWER TURN-ON SEQUENCE

The circuitry components which have two stable states of equilibrium would assume some random order relative to whatever state they were in when power was turned off. In order to achieve synchronization within the system, the Checker and Automatic Synchronizer must be restored to its starting condition. When power is turned on, Received Data Flip-Flop 78, Alarm Check Flip-Flop 144, and Control Flip-Flop 180 are held in the ON condition while Master Alarm Flip-Flop 178 is held in the OFF condition by applying a biasing voltage of −12 volts through the normally closed contact 129 of relay 126 and the respective 16,000 ohm dropping resistor 81. The holding coil 128 of relay 126 is not at first energized, because it is connected through output terminal 11 of Time Delay 125 to the negative source of voltage, and the delay period has to run before the voltage across the holding coil builds up to the pull in value. See FIG. 19a. The delay period is set long enough to allow the power supplies to stabilize before the equipment is allowed to proceed automatically. When the relay 126 does pull in, it removes the −12 volt biasing voltages from the respective set or reset terminals and leaves Received Data Flip-Flop 78, Alarm Check Flip-Flop 144, and Control Flip-Flop 180 in the ON condition and Master Alarm Flip-Flop 178 in the OFF condition. The 16K Resistor line 81 slowly discharges through RC Network 124. When Control Flip-Flop 180 is ON, it blocks off data input to Transmit Coding Equipment 14a from Transmit Terminal Equipment 12a because its positive output on terminal 9 inverted to a negative level through Inverter 175 will inhibit AND Gate 197 on terminal 17. At the same time the negative output on terminal 4 of Control Flip-Flip 180 will actuate Automatic Control Indicator 176 through isolating Indicator Driver 182.

As the voltage to the four 16,000 ohm resistors 81 rises from −12 volts to ground voltage through the normally open contact 130 of relay 126, the positive going edge produces an input to Pulse Gate 152 on input terminal 8. Pulse Gate 152 is held at ground voltage reference level through terminal 7. Pulse Gate 152 outputs positively through terminal 6 to one shot 148 on input terminal 4. This triggers a negative delay pulse, in this embodiment of 100 millisecond duration, through output terminal 3 of One Shot 148 to One Shot 149. The negative going edge has no effect on One Shot 149 because of the polarity of the diode shown in FIG. 8a which connects input terminal 2 to the base of the first transistor of One Shot 149. However, the positive going edge triggers One Shot 149 after the 100 millisecond pulse period and One Shot 149 puts out a positive pulse, in the present embodiment of 1 millisecond duration, to Inverter 150. Inverter 150 inverts this to a negative pulse which is applied to OR Gate 137 on input terminal 3 to initiate the RESET-START SEQUENCE described next.

The same thing occurs at Remote Station 11 when the Operator turns on the power.

RESET-START SEQUENCE

This sequence is initiated by OR Gate 137 which outputs to pull in the Reset Relays 67a and 68a in the local Receive Coding Equipment 31a and Transmit Coding Equipment 14a thus resetting the circuitry within the Coding Equipments and turning on Reset Indicator line 15a. When the Reset Indicator line goes on it insures that Control Flip-Flop 180 is on, so that Checker and Automatic Synchronizer 70a has control of the system. At the same time provided that Receive Coding Equipment 31a is receiving transmissions from Transmit Coding Equipment 14b at Remote Station 11 it activates circuitry which output through a timer and after a delay of 128 bits plus 50 milliseconds energizes Start line 17a to initiate synchronizing pulses from the Transmit Coding Equipment 14a. If this pulse is not received it will not start synchronizing but will remain in the Reset condition. So long as Transmit Coding Equipment 14a is in the Alarm Check condition with Alarm Check Relay 69a closed as described hereafter under Alarm Check Sequence, no signal goes out of Transmit Coding Equipment 14a and over the line to Receive Coding Equipment 31b at the Remote Station 11. However, after successful completion of an Alarm Check, the block is removed from the output of Transmit Coding Equipment 14a and on the immediately following RESET-START SEQUENCE, the 128 bit plus 50 millisecond constant level Reset Command is transmitted over line 25a and received by Checker and Automatic Synchronizer 70b at the Remote Station 11 to trigger the remote Reset Counter 100 as described hereafter under OPEN LINE DETECTION SEQUENCE. This initiates a RESET-START SEQUENCE in Transmit Coding Equipment 14b at the Remote Station 11.

Basically the resetting of the internal circuitry of Transmit Coding Equipment 14a and Receive Coding Equipment 31a for the start of the synchronizing procedure is originated at OR Gate 137, by the presence of a negative pulse on any one of the input terminals 2, 3, 4 or 5. Assuming the negative pulse arrives on input terminal 3 as a result of the POWER TURN-ON SEQUENCE, Negative OR Gate 137 outputs positively to One Shot 141. This positive pulse triggers One Shot 141 to output in a negative pulse over its output terminal 20. In the present embodiment this pulse duration is 80 milliseconds. The 80 millisecond negative pulse is transmitted to both Indicator Drivers 136 and 147 through their respective input terminals 21.

These Indicator Drivers act as switches by closing their emitter-collector circuits (See FIG. 18a) for the 80 millisecond period to actuate the Reset Relays 67a and 68a in Receive Coding Equipment 31a and Transmit Coding Equipment 14a respectively. Indicator Driver 136 completes the circuit through ground from its output terminal 13, through Relay Contact 108 closed between its input terminal 5 and output terminal 17, and down Reset line 32a through the holding coil of the Receive Coding Equipment Relay 67a to the negative source of voltage. Similarly, Indicator Driver 147 completes the circuit through ground from its output terminal 12, through Relay Contact 154 closed between its input terminal 15 and output terminal 8 and down Reset line 18a through the holding coil of the Transmit Coding Equipment Relay 68a to the negative source of voltage.

When the two Reset Relays 67a and 68a pull in, and in present Coding Equipments it is after a delay of 30 to 70 milliseconds, they initiate the resetting of the internal circuitry within the Receive Coding Equipment 31a and the Transmit Coding Equipment 14a. This is indicated within blocks 31a and 14a by a relay contact on Reset Relays 67a and 68a whose output is labelled "TO INTERNAL CIRCUITRY". In the reset condition, Transmit Coding Equipment 14a has a constant level positive voltage at its output terminals.

When Reset Relay 68a in Transmit Coding Equipment 14a closes, it energizes Reset Indicator line 15a negatively. The negative voltage level passes through Emitter Follower 145 which acts as a buffer isolating Reset Indicator line 15a from the subsequent circuitry. After passing through Emitter Follower 145, the negative level signal is applied to AND Gate 139 on input terminal 12. The enabling condition for AND Gate 139 is that Receive Coding Equipment 31a is receiving transmissions from Transmit Coding Equipment 14b at Remote Station 11 as indicated by a negative level signal on input terminal 13 to be described later under OPEN LINE DETECTION SEQUENCE. If Receive Coding Equipment 31a is receiving transmissions and input terminal 13 of AND Gate 139 is enabled, then the negative signal is inverted through output terminal 16 of AND Gate 139 and applied to terminal 3 of Control Flip-Flop 180 to insure that it is on. It also passes as a positive going signal to Pulse Gate 95 on terminal 5. Pulse Gate 95 is held at ground reference level on terminal 4. The positive going transition on input terminal 5 of Pulse Gate 95 results in a positive pulse output on terminal 3 which is applied to terminal 5 of Flip-Flop 88 to set it. After being set, Flip-Flop 88 outputs negatively over terminal 4 to enable AND Gate 89 on its input terminal 3. When AND Gate 89 is enabled, it passes clock pulses through its output terminal 6 to one of the inputs to 128 Counter 99 whenever a clock pulse is received on terminal 2 from Receive Modem 28a through terminal 13 of Schmitt Trigger 71. The other input to 128 Counter 99 comes from Inverter 96 which inverts the complementary output from terminal 21 of Schmitt Trigger 71, so that it is in phase with the normal output from terminal 13.

128 Counter 99 is made up of ÷ 16 Binary Counters 90 and 97 AND Gate 91, 92 and 93 and Inverter 94. Binary Counters 90 and 97 are conventional four-stage counters shown in FIG. 10a which after being reset will pass an output pulse along to the subsequent counter for every 16 input pulses from the preceding stage. A count of 2 on Binary Counter 97 constitutes 32 clock pulses, a count of 3 constitutes 48 clock pulses, etc. As both Binary Counters 90 and 97 are capable of being read out in parallel, individual counts are available.

The presence of the three AND Gates 91, 92 and 93 and Inverter 96 is due to the fact that the outputs from the individual counter stages are noisy and an output may occur on the counter AND Gates 91, 92 and 93 as the counter nears the number to which it is set but before its actual occurrence. Having a clock pulse from Inverter 96 enable each of AND Gates 91 and 92 limits the outputting of these AND Gates to the last half of each pulse. Having AND Gate 91 and 92 enable AND Gate 93 insures that 128 Counter 99 will not output before 128 counts. It should be noted that the inputs to AND Gate 93 are negative and the inputs to AND Gate 92 are positive. Hence, the last two stages of Binary Counter 97 output from opposite polarity Flip-Flops on terminals 7 and 5 than do the first two stages from terminals 8 and 11 as reference to FIG. 10a will show.

At clock pulse 128, AND Gate 93 outputs positively to Inverter 94 which inverts to apply a positive pulse to Flip-Flop 88 on its input terminal 11 turning off Flip-Flop 88, which in turn removes the negative voltage from and disables AND Gate 89, so that no more clock pulses are received by 128 Counter 99. The output of 128 Counter 99 on terminal 11 of AND Gate 93 is also applied as a negative voltage from terminal 16 of Inverter 94 to input terminal 13 of AND Gate 134 which was enabled by a negative signal on input terminal 12 when Reset Indicator line 15a was energized. AND Gate 134 outputs positively to One Shot 135. Following a 50 millisecond delay, One Shot 135 outputs in a positive going transition through closed Relay Contact 153 and Start line 17a to initiate the START circuitry within Transmit Coding Equipment 14a thereby sending it into a synchronizing phase of operation and turning off Reset Indicator line 15a. The positive output of 128 Counter 99 from terminal 11 of AND Gate 93 is also applied to terminal 9 of AND Gate 133.

However, AND Gate 133 will normally be inhibited by a negative signal on terminal 10 as described later under RECEIVE CODING EQUIPMENT OPERATING CONDITION CHECK SEQUENCE.

ALARM CHECK SEQUENCE

As previously stated, an Alarm Check is required by doctrine procedure to be performed after switching on power and after an actual alarm. It was also stated in the description of the POWER TURN-ON SEQUENCE that at power turn-on, a RESET-START is initiated and the Alarm Check Flip-Flop 144 is forced to the ON condition. With these two situations, the equipment will go through the first Alarm Check. The RESET-START SEQUENCE ends with initiation of the synchronizing procedure. With Alarm Check Flip-Flop 144 turned on, after completion of the first synchronizing procedure plus a fixed period of delay, the internal alarm circuitry of Transmit Coding Equipment 14a should produce an alarm; otherwise the Transmit Coding Equipment is malfunctioning. So long as Alarm Check Flip-Flop 144 is turned on, its terminal 19 will apply a negative voltage to Relay Driver 151. Relay Driver 151 acts as a switch by closing its emitter-collector circuit (See FIG. 20a) to complete the circuit through ground, its output terminal 4, closed Relay Contact 156 and down Alarm Check line 20a through the holding coil of the Transmit Coding Equipment Alarm Check Relay 69a to the negative source of voltage. This in turn will block off the output from the Transmit Coding Equipment 14a. The negative voltage on terminal 19 of Alarm Check Flip-Flop 144 is also applied through Indicator Driver 183 to actuate the Alarm Check Indicator 177. If the Alarm Indicator line 19a does not go on while Alarm Check Flip-Flop 144 is on, it indicates something is wrong and the system will hang there until the ALARM CHECK TIME DELAY runs out as described hereafter. After the conclusion of a successful ALARM CHECK SEQUENCE, Alarm Check Flip-Flop 144 is still on, and Alarm Indicator line 19a will be energized negatively. Emitter Follower 155 isolates Alarm Indicator line 19a from the subsequent circuitry and passes the negative signal to terminal 8 of AND Gate 142. AND Gate 142 will output if it has been enabled by a negative signal on input terminal 9. This is the case if One Shot 141 is turned off, which it is if everything is functioning properly. AND Gate 142 then outputs positively to trigger One Shot 143. One Shot 143 outputs in a 1 millisecond negative pulse to turn Alarm Check Flip-Flip 144 OFF. This in turn releases Alarm Check Relay 69a.

Assuming there is no trouble with the alarms, at the time that Alarm Check Flip-Flop 144 was turned off with the negative pulse from One Shot 143, the positive going trailing edge of the negative pulse also triggered One Shot 148 on input terminal 2. After a 100 millisecond delay which allows Alarm Check Relay 69a to release, One Shot 148 outputs negatively to trigger One Shot 149 whose output pulse is inverted in Inverter 150 to a positive output which is applied to OR Gate 137 on input terminal 3 to re-initiate a RESET-START SEQUENCE as described in that sequence. This time, however, Transmit Coding Equipment 14a will complete a legitimate Reset Command and synchronization cycle and attempt to synchronize Receive Coding Equipment 31b to which it is connected over line 25a. This does not happen after the Alarm Check Reset Start sequence because the data output of Transmit Coding Equipment 14a is internally blocked off by the Alarm Check Relay 69a.

It should be noted that input terminals 12 and 20 of Alarm Check Flip-Flop 144 which are capacitor inputs are connected together which makes the Alarm Check Flip-Flop act as a binary Flip-Flop rather than as a set-reset flip-flop so far as those inputs are concerned. See FIG. 13a. Hence, the pulse applied to terminals 12 and 20 will cause the Alarm Check Flip-Flop 144 to change its existing state whatever it happens to be at that instant to the complimentary state. This is necessary because in the Alarm Check mode, the signal from the Alarm Indicator line 19a wants to turn the Alarm Check Flip-Flop 144 off and it is then in the ON Condition, while in the normal operating mode, the Alarm Indicator line signal wants to to turn Flip-Flop 144 on and it is then in the OFF condition.

ALARM CHECK TIME DELAY

Alarm Check Flip-Flop 144 is turned ON in the Alarm Check mode or when Transmit Coding Equipment 14a goes into the Alarm condition. If the Transmit Coding Equipment 14a does not leave the Alarm condition as indicated by the failure of the Alarm Check Flip-Flop 144 to go off, which it will not do if a legitimate alarm condition exists, a time delay circuit connected to Alarm Check Flip-Flop 144 is activated and will turn on the Master Alarm Flip-Flop 178 and activate the Master Alarm 172 if the Transmit Coding Equipment 14a does not produce a satisfactory Alarm Check within the time delay period, in this embodiment of 4096 bits. This counter could be replaced in the present embodiment by a one shot time delay which would be advantageous at clock rates of about 500 cycles per second or higher.

When Alarm Check Flip-Flop 144 goes on it outputs negatively over terminal 19 to enable AND Gate 191 on input terminal 18. This will permit AND Gate 191 to pass clock pulses received on input terminal 17 to Time Delay Counter 190. Time Delay Counter 190 consists of three cascaded ÷16 Binary Counters 192, 193 and 194 shown in FIG. 11a with the output taken off the ON position of the last stage of the third counter to output negatively to AND Gate 187 after 4096 counts. AND Gate 187 is enabled on input terminal 10 by the negative output from terminal 19 of Alarm Check Flip-Flop 144 in the ON condition. As previously stated Alarm Check Flip-Flop 144 remains ON in the Alarm Check mode if the Alarm Indicator line 19a doesn't go on which indicates trouble and it remains ON in the normal operating mode if the Alarm Indicator line 19a doesn't go off which indicates trouble, so if the Alarm Check Flip-Flop 144 remains on for 4096 counts, AND Gate 187 outputs positively to Pulse Gate 186 which is also enabled by the positive output from terminal 14 of Alarm Check Flip-Flop 144 in the ON condition through Emitter Follower 189 which acts as a buffer between the Flip-Flop output and the subsequent circuitry. The 1K resistor 188 provides an external DC load to AND Gate 187 during its OFF condition. This loading is necessary to prevent Pulse Gate 186 from outputting falsely at the turn on of Time Delay Counter 190. A false output would occur without the loading resistor because of the difference of the DC levels on the inputs to Pulse Gate 186. Pulse Gate 186 thereupon applies a positive pulse to terminal 17 of Master Alarm Flip-Flop 178 to turn the Master Alarm ON. If at any time before the 4096 count period, Alarm Check Flip-Flop 144 goes OFF, a negative pulse appears on output terminal 14 and is passed with negative polarity through Emitter Follower 189 to the Time Delay Counter 190 and the reset terminals 20 of each 16 Binary Counter 192, 193 and 194 to reset Time Delay Counter 190 to zero.

When Master Alarm Flip-Flop 178 is turned ON it outputs negatively over terminal 19 through isolating Indicator Driver 179 to turn on Master Alarm Indicator 173 and also outputs positively over terminal 14 through isolating Emitter Follower 171 to turn on Master Alarm 172.

RECEIVE CODING EQUIPMENT OPERATING CONDITION CHECK SEQUENCE

This is a check which is made with Receive Coding Equipment 31a at the Local Station 27, 80 milliseconds plus 128 bits after the local Transmit Coding Equipment 14a moves into the full Operating condition. It will be remembered that the Operate Indicator line 16a goes on immediately after the conclusion of the synchronizing cycle. When the Receive Coding Equipment 31b at the Remote Station 11 receives the Reset Command from the Transmit Coding Equipment 14a at the Local Station 27, its Reset Counter 100 counts 64 bits as described on the OPEN LINE DETECTION SEQUENCE hereafter and then outputs to initiate a RESET-START SEQUENCE of its own back to Receive Coding Equipment 31a. After the synchronization is completed both Coding Equipments at either end of the line should have their Operate Indicators go on, so if Operate Indicator line 33a in Receive Coding Equipment 31a does not go on after a delay of 80 milliseconds plus 128 bits, the local Checker and Automatic Synchronizer 70a will conclude that some condition is causing malfunctioning within the duplex loop and will immediately generate a command to resynchronize all Coding Equipments within the duplex system. If both Operate Indicator lines 33a and 16a in the local Receive Coding Equipment 31a and Transmit Coding Equipment 14a are on, the system operation is not interrupted. When Operate Indicator line 16a in Transmit Coding Equipment 14a goes on there is a negative voltage on the line. This voltage passes without change in polarity through isolating Emitter Follower 146 to AND Gate 138 which was enabled when Control Flip-Flop 180 was turned on at power turn-on. When Control Flip-Flop 180 is turned on, it outputs positively on terminal 9 and this positive voltage was inverted through Inverter 174 to have the correct negative enabling polarity at terminal 4 of AND Gate 138. AND Gate 138 outputs positively to trigger One Shot 98 into a negative delay pulse, in the present embodiment of 80 milliseconds duration. The positive output of AND Gate 138 is also applied to enable AND Gate 133 on terminal 8. The positive going edge of the 80 millisecond pulse applied to input terminal 3 causes Flip-Flop 88 to output negatively on its terminal 4 and enable AND Gate 89 on terminal 3 which then passes negative going clock pulses to terminal 2 of 128 Counter 99. After 128 counts, 128 Counter 99 outputs positively over terminal 11 of AND Gate 93, as described under the RESET-START SEQUENCE, to terminal 9 of AND Gate 133. AND Gate 133 will output if it has a positive signal or no signal on each of its four inputs, therefore its condition for an output from AND Gate 133 is concurrence with the following:

A. The absence of an output on the Operate Indicator line 33a or the Alarm Indicator line 50a in Receive Coding Equipment which would otherwise be brought to terminal 10 of AND Gate 133 if Operate Indicator line 33a is on, it applies a negative output unchanged in polarity through Emitter Follower 107 to terminal 18 of OR Gate 122. This has no effect on OR Gate 122 unless there is a positive voltage on terminal 17 at the same time which will only occur if Alarm Indicator 50a and Operate Indicator 33a go on at the same time causing conduction of AND Gate 115 as discussed later under MISCELLANEOUS CIRCUITRY. If this is not the case, then the output of AND Gate 122 remains at ground and this is inverted negatively through Inverter 123 to apply a negative inhibiting voltage on terminal 10 of AND Gate 133 which will not output. If Operate Indicator line 33a is not on, then the line is at ground potential which will go through Emitter Follower 107 without polarity change to inhibit AND Gate 115 by a positive voltage on terminal 18 so the output of AND Gate 115 remains at a negative potential. It also applies a positive voltage to terminal 18 of OR Gate 122 which in conjunction with the negative potential on terminal 17 will output negatively to Inverter 123. Inverter 123 outputs positively in turn to enable terminal 10 of AND Gate 133.

B. An output from 128 Counter 99 applied as a positive voltage to terminal 9 of AND Gate 133 as described above.

C. An output from the Operate Indicator line 16a of Transmit Coding Equipment 14a applied as a positive voltage to terminal 8 of AND Gate 133 as described above.

D. The absence of a voltage on the Alarm Indicator line 19a of the Transmit Coding Equipment 14a which is brought to AND Gate 133 on terminal 7 through Emitter Follower 155.

With the concurrence of these four conditions, AND Gate 133 outputs to OR Gate 37 and re-initiates the RESET-START SEQUENCE to resynchronize all Coding Equipments in the duplex system. Of course if the Receive Coding Equipment 31a has its Operate Indicator line 33a energized and the Alarm Indicators 50a and 19a are not on, then presumably the Equipments are operating satisfactorily, and the synchronizing operation is not initiated.

SYNCHRONIZATION VERIFICATION SEQUENCE

After the local Checker and Automatic Synchronizer 70a has satisfactorily completed the RECEIVE CODING EQUIPMENT OPERATING CONDITION CHECK SEQUENCE as described above to show that all Coding Equipments in the duplex loop are apparently in synchronization, it checks the output of Receive Coding Equipment 31a to verify the apparent synchronization. At this point Checker and Automatic Synchronizer 70a is still in control because Control Flip-Flop 180 is still in the ON condition and this inhibits its data from Transmit Terminal Equipment 12a getting to Transmit Coding Equipment 14a through AND Gate 197 as described under POWER TURN-ON SEQUENCE. The same thing is true of the remote Checker and Automatic Synchronizer 70b at the Remote Station 11. Hence, there is no data being transmitted over the duplex loop and if the Receive Coding Equipment 31a has been properly synchronized with the Transmit Coding Equipment at the opposite end of the line, there should be no data transmissions at the output of the Receive Coding Equipment. This output is sampled by the local Checker and Automatic Synchronizer 70a over line 49a for a period of 15 bits. The remote Checker and Automatic Synchronizer at Remote Station 11 does the same thing with the Remote Receive Coding Equipment 31b.

The Transmit and Receive Coding Equipment pairs are out of synchronism if there are any data transmissions during this 15 bit time. After making the 15 bit data verification, Checkers and Automatic Synchronizers 70a and 70b will relinquish control of the system by turning off their respective Control Flip-Flops 180 and releasing data from Transmit Terminal Equipments 12a and 12b to the Transmit Coding Equipments 14a and 14b. They will Master Alarm and initiate a new RESET-START SEQUENCE and resynchronizing procedure if the appearance of data on lines 49a and 49b show that either Receive Coding Equipment is out of synchronization with the Transmit Coding Equipment which is sending it information. Either or both Master Alarm Flip-Flops 178 at the local and remote stations 27 and 11 respectively will stay on until the verification is positive and the entire duplex loop is properly synchronized.

When both Operate Indicator lines 33a and 16a are energized in Receive Coding Equipment 31a and Transmit Coding Equipment 14a, their negative outputs are applied through isolating Emitter Followers 107 and 146 to terminals 5 and 3 respectively of AND Gate 116 without changing polarity. The remaining terminal 2 has a negative voltage applied to it as a result of the existing output state of Flip-Flop 131 which had last been triggered on its input terminal 12 by a positive pulse from AND Gate 134. The purpose of the third input on terminal 2 of AND Gate 116 is to prevent spurious triggering of the gate. When the Reset lines 32a and 18a are energized and the Reset Relays 67a and 68a pull in, they create circuit noise which may create an output signal on Operate Indicator lines 16a and 33a which could trigger AND Gate 116 except for the absence of a signal on terminal 2. When, therefore, all three inputs of AND Gate 116 have negative signals, the AND Gate outputs positively to Flip-Flops 117 and 167.

Flip-Flop 167 outputs positively on its terminal 9 applying a positive inhibiting voltage on terminal 9 of AND Gate 185 which keeps Master Alarm Flip-Flop 178 in the OFF Condition. Flip-Flop 167 also outputs negatively over its terminal 4 to enable AND Gate 170 on its terminal 14. Terminal 13 of AND Gate 170 and terminal 8 of AND Gate 185 are enabled by a negative voltage applied through Inverter 174 when Control Flip-Flop 180 is turned on.

Flip-Flop 117 in Verification Counter 114 outputs negatively over terminal 19 to enable AND Gate 118 on its terminal 18. AND Gate 118 thereupon passes clock pulses to terminal 2 of ÷16 Binary Counter 119. At 15 counts all of the four stages of Binary Counter 119 are set and positive voltages are applied to each of the four inputs of AND Gate 120 which then outputs negatively to Inverter 113. Inverter 113 thereupon passes a positive voltage to terminal 10 of AND Gate 121. Terminal 7 of AND Gate 121 has been enabled by a positive voltage from terminal 14 of Flip-Flop 117 when the Flip-Flop was turned ON. The clock pulse on the other input 9 of AND Gate 121 again insures outputting at the proper time. When AND Gate 121 outputs negatively, the negative pulse is applied to terminal 12 of AND Gate 170 causing it to output positively to terminal 12 of Master Alarm Flip-Flop 178 which keeps it in the OFF condition. The positive output from AND Gate 170 is also applied to terminal 11 of Control Flip-Flop 180 turning it off. When Control Flip-Flop 180 goes off it changes its output voltage on terminal 9 which goes negative, is inverted positive through Inverter 175 to remove the inhibit on AND Gate 197, and releases data from Transmit Terminal Equipment 12a to Transmit Coding Equipment 14a through Schmitt Trigger 196, AND Gate 197, Inverted 198, buffering Logic Inverter 199 and terminal 18 of closed Relay Contact 195. The negative output from AND gate 121 is also applied to terminal 12 of Flip-Flop 117 turning it off. In the OFF condition, Flip-Flop 117 outputs positively on terminal 19 to disable terminal 18 of AND Gate 118 and cut off clock pulses to ÷16 Binary Counter 119.

Now if during the 15 bit verification period any data transmissions are received over line 49a, they will trigger Schmitt Trigger 169 which will apply a negative going pulse to AND Gate 168 which was enabled with a negative pulse on its terminal 3 through Inverter 174 when control Flip-Flop 180 was turned on. Thereupon AND Gate 168 will output positively to terminal 11 of Flip-Flop 167 to turn it OFF. The positive output of terminal 4 of Flip-Flop 167 in the OFF condition inhibits AND Gate 170 while the negative output of terminal 9 of Flip-Flop 167 in the OFF condition will enable AND Gate 185 on terminal 9. Terminal 8 of AND Gate 185 was also enabled with a negative voltage through Inverter 174 when Control Flip-Flop 180 was turned on. With AND Gate 185 now completely enabled on terminals 8 and 9, the negative output at the end of the 15 bit verification period on terminal 11 of AND Gate 121 is now applied to terminal 7 of AND Gate 185 which outputs positively to terminal 20 of Master Alarm Flip-Flop 178 turning it on and energizing Master Alarm Indicator 173 through Indicator Driver 179 and Master Alarm 172 through a positive voltage in terminal 14 of Master Alarm Flip-Flop 178 which is transmitted through Emitter Follower 171 to energize Master Alarm 172. At the same time, the positive output from AND Gate 185 is applied through Inverter 184 as a negative voltage to terminal 4 of OR Gate 137 to indicate a new RESET-START SEQUENCE.

So long as the malfunction exists and data transmissions are received over line 49a, the following events will occur:

1. AND Gate 185 will output.
2. Master Alarm 172 and Master Alarm Indicator 173 will stay on.
3. Checker and Automatic Synchronizer 70a will indefinitely attempt to resynchronize. When the malfunction is corrected and data transmissions are no longer received over line 49a during the verifying period, Schmitt Trigger 169 no longer outputs to AND Gate 168. When AND Gate 116 outputs again, the positive going pulse applied to terminal 3 of Flip-Flop 167 turns it on again so that the inhibit is removed from terminal 14 of AND Gate 170. AND Gate 170 thereupon outputs positively again to terminal 12 of Master Alarm Flip-Flop 178 turning off Master Alarm 172 and Master Alarm Indicator 173. The positive output from AND Gate 170 is also applied to terminal 11 of Control Flip-Flop 180 turning it off.

If it is desirable not to have Checker and Automatic Synchronizer 70a continually trying to resynchronize, Optional Jumper 184a may be removed. In such a case, in the present embodiment, when the jumper is removed, the input to Inverter 184 on terminal 5 must be tied to the −V supply.

OPEN LINE DETECTION SEQUENCE

Open line detection is made by the Reset Counter 100. This counter is driven by clock pulses once each bit and is reset each time there is a level change in the digital input data going to the Receive Coding Equipment 31a. Since coding equipments generally try to approach random conditions, the accumulated counts would generally not exceed 2 or 3 on an average. Reset Counter 100 will output after 64 counts. Any stretch of data or lack of it which will go 64 bits without a level change means that either the Transmit Coding Equipment 14b at the other end of the line has failed, is putting out a Reset Command or there is a line break. If the local Checker and Automatic Synchronizer 70a has released the system for normal operation between Terminal Equipments, so that the constant level signal does not indicate that the remote Transmit Coding Equipment 14b is issuing a Reset Command signal following the initiating synchronizing procedure of the local Transmit Coding Equipment 14a, then Checker and Automatic Synchronizer 70a will take over control and attempt to resynchronize the system by generation of a pulse from Reset Counter 100 to initiate a RESET-START SEQUENCE; this condition might occur for example when the line is broken subsequent to a valid synchronization. At this point Control Flip-Flop 180 turns on and all further outputs from the Reset Counter will be unused until the Control Flip-Flop turns off. If on the contrary, the local Checker and Automatic Synchronizer 70a had not released the system then the constant level signal detected by the local Reset Counter 100 would be the Reset Command signal of the Remote Transmit Coding Equipment 14b, the Local Station 27 is already in the RESET-START SEQUENCE and Control Flip-Flop 180 would inhibit the initiation of another such sequence.

Received encoded information bearing data from Remote Station 11 enters Checker and Automatic Synchronizer 70a, after being demodulated in Receive Demodulator 28a, over line 47a, into Schmitt Trigger 72 and out its normal output terminal 11 into Reset Counter 100 through Pulse Gate 85 to terminal 17 of Flip-Flop 86. Similarly the same information comes out the complementary output terminal 3 of Schmitt Trigger 72 but reversed in phase and is applied to terminal 20 of Flip-Flop 86 to reinforce the switching action. When the data level changes indicating that digital pulses are being received, the level changes applied to terminals 17 and 20 reverse and change the output on terminals 14 and 19. The output change on terminal 19 of Flip-Flop 86 applied to terminal 20 of Binary Counter 82 will reset that counter while the corresponding but reverse polarity change on terminal 14 of Flip-Flop 86 when applied through Inverter 87 to terminal 20 of Binary Counter 83 resets Binary Counter 83 to the same state as Binary Counter 82. The purpose of input 12 to Flip-Flop 86 is to set it in the state where Binary Counters 82 and 83 can be driven toward the total count of 64; the purpose of inputs 17 and 20 is to reset Flip-Flop 86 so that Binary Counters 82 and 83 will not reach a count of 64.

As was discussed previously for 128 Counter 99, terminals 9, 13 and 7 of Binary Counter 82 enable AND Gate 77 which requires positive inputs, and terminal 4 of Binary Counter 82 plus terminals 8 and 11 of Binary Counter 83 enable AND Gate 84 which requires negative inputs, so that the individual counter outputs are taken from opposite polarity flip-flops within the counter stages as required. Also, as discussed for 128 Counter 99, input 15 to AND Gate 84 enables AND Gate 77 to overcome the possibility of a premature output when the counters approach the number to which they are set.

Clock pulses are continuously applied from Receive Demodulator 28a through the normal output terminal 13 of Schmitt Trigger 71 to Reset Counter 100 on input terminal 2 of Binary Counter 82. If the counter is not reset by a data level change within 64 counts, at the 64th count Binary Counter 83 enables terminals 12, 13 and 14 of AND Gate 84 with a negative voltage. The negative going edge of the instant clock pulse through Schmitt Trigger 71 is applied to terminal 15 of AND Gate 84 causing it to output positively to terminal 10 of AND Gate 77 which has also been enabled on terminals 7, 8 and 9 by positive outputs from Binary Counter 82 at count 64.

AND Gate 77 outputs negatively to OR Gate 110 on terminal 12 which thereupon outputs positively to terminal 2 of AND Gate 132. The enabling conditions of AND Gate 132 are as follows:

a. Alarm Indicator line 19a on Transmit Coding Equipment 14 cannot be energized. (AND Gate 132 will output with either a positive signal or no signal on all of its inputs if Alarm Indicator line 19a is activated negatively. Any negative inhibiting signal from Alarm Indicator line 19a is brought through Emitter Follower 155 to terminal 4 of AND Gate 132).

b. Control Flip-Flop 180 must be off indicating that the Local Station 27 is not already in the RESET-START SEQUENCE. Any negative signal from Control Flip-Flop 180 will have been inverted through Inverter 175 and applied to inhibit terminal 5 of AND Gate 132. Since this indicates that the local Transmit Coding Equipment 14a is already going through a RESET-START SEQUENCE, there would be no purpose in initiating another one.

c. Operate Indicator line 16a on Transmit Coding Equipment 14a must be energized. The negative voltage on Operate Indicator line 16a is brought through Emitter Follower 146, inverted to a positive voltage through Inverter 140 and applied to enable terminal 3 of AND Gate 132.

When the output of Reset Counter 100 is applied to terminal 2 of AND Gate 132 as described above, it outputs to OR Gate 137 on terminal 5 to initiate a RESET-START SEQUENCE. At the time that OR Gate 137 outputs positively, the positive voltage is applied to terminal 3 of Received Data Flip-Flop 78 to turn it off. However, one-half clock pulse later, the positive going trailing edge of the negative pulse output of AND Gate 77 turns Received Data Flip-Flop 78 back on again. When Received Data Flip-Flop 78 is on, it outputs negatively over terminal 9 to enable terminal 13 of AND Gate 139 for the RESET-START SEQUENCE. Actually if the Remote Station 11 were on the air at all, the maximum period that terminal 13 of AND Gate 139 could be disabled would be from Power turn-on until 64 bits after it had first sent its Reset Command over line 25b to the local Checker and Automatic Synchronizer 70a, for at this point in time the local Reset Counter 100 would output to terminal 11 of Received Data Flip-Flop 78 to turn it back on.

DATA GATING

Data inputs to the Transmit and Receive Coding Equipments are gated in such a manner as to protect secure data and facilitate synchronization of the duplex loop. By the term data in this context is meant coded information from a Terminal Equipment, not a Reset Command or a synchronizing pulse.

Received Data Gating:

Received data gating controls the input to the Receive Coding Equipment 31a by the state of Received Data Flip-Flop 78. The input is open when Received Data Flip-Flop is turned on and blocked when Received Data Flip-Flop is turned off. Received Data Flip-Flop 78 is required to inhibit the passage of data to the Receive Coding Equipments before the opposite link end issues its Reset Command, otherwise the Receive Coding Equipments would synchronize falsely. The passage of a Reset Command or synchronizing pulse or merely a blank period would not cause a false synchronization.

For a proper understanding of Received Data Gating it must be remembered that Reset Counter 100 outputs whenever the signal received at the output of Receive Modem 28a remains at an unchanging level for a period of 64 bits. Now if both lines are in full operation, so that Checker and Automatic Synchronizer 70a does not have control, and Reset Counter 100 outputs from terminal 11 of AND Gate 77 in a negative pulse, it will be remembered from the description of the OPEN LINE DETECTION SEQUENCE that a Reset Command was immediately issued and that Received Data Flip-Flop 78 was only turned off for an instant and then turned on again, so that data can flow to Receive Coding Equipment 31a. However, this condition will only continue until the Checker and Automatic Synchronizer 70b at the other end of the line issues its start command.

The positive output on terminal 4 of Received Data Flip-Flop 78 when it is turned back on by the trailing positive going edge of the output pulse of Reset Counter 100 enables AND Gate 73 on its terminal 3. The signal on terminal 2 of AND Gate 73 should be explained. Actually it will go positive or negative depending upon the data level. Data is applied to Schmitt Trigger 72 and taken off terminal 3 which is the complementary output so it is inverted. It is inverted again in AND Gate 73 and in Logic Inverter 75 which makes three stages of inversion. Hence, a fourth stage is required to insure the original data polarity when it enters Receive Coding Equipment 31a. Whenever the data at the output of Schmitt Trigger 72 is positive and Received Data Flip-Flop 78 is on, AND Gate 73 will output negatively to AND Gate 74. AND Gate 74 is enabled by a positive voltage on terminal 8 when Alarm Check Flip-Flop 144 is off, otherwise AND Gate 74 is inhibited. AND Gate 74 thereupon outputs positively through buffering Logic Inverter 75 which inverts the signal again and it is passed through Relay Contact 76 closed through terminal 19 to Receive Coding Equipment 31a.

Transmit Data Gating:

Transmit Data Gating controls the Transmit Coding Equipment 14a input from Transmit Terminal Equipment 12a. Data is cut off so long as Checker and Automatic Synchronizer 70a is in control of the local link end. Control Flip-Flop 180 is turned on at power turn-on or immediately after the Reset Indicator line 15a goes on. The positive output on terminal 9 of Control Flip-Flop 180 in the ON condition is inverted negatively through Inverter 175 and applied to inhibit AND Gate 197 on terminal 17 thereby preventing the flow of transmit data to Transmit Coding Equipment 14a. When Control Flip-Flop 180 is turned off the inhibit is removed from terminal 17 of AND Gate 197 and data passes from Transmit Terminal Equipment 12a through Schmitt Trigger 196 which changes the level of the data signal, through AND Gate 197, inverted through Inverted 198, through the buffering stage of Logic Inverted 199, and Relay Contact 195 closed through terminal 18 to Transmit Coding Equipment 14a.

MISCELLANEOUS CIRCUITRY

Many terminal equipments employ a checking capability. Checker and Automatic Synchronizer 70 allows this capability to be utilized for resynchronizing the Coding Equipments in a duplex loop. The basic resynchronization circuit is a one shot multivibrator driven by a Schmitt Trigger which in the embodiment shown in FIGS. 4b and 4c should be supplied a positive going pulse by the data handling terminal equipment.

The Remote Resynchronization capability as adapted for use with Checker and Automatic Synchronizer 70a is shown as a block 111, whose output is a positive going pulse which triggers Schmitt Trigger 112 so that the positive going edge of its output pulse is applied to trigger One Shot 109 to output negatively to terminal 13 of OR Gate 110. OR Gate 110 outputs positively to AND Gate 132 and initiates a RESET-START SEQUENCE as described before.

The Reset Relays 67a and 68a in Receive Coding Equipment 31a and Transmit Coding Equipment 14a generate transients at times in the Security Equipments of the present embodiment when they pull in which may falsely indicate their operational status. Thus the internal alarm circuitry in the Receive Coding Equipment 31a may be triggered in such a manner as to cause the Alarm Indicator Line 50a to go on with the Operate Indicator line 33a. The net effect of this would be no passage of data through the Receive Coding Equipment 31a, although Checker and Automatic Synchronizer 70a would find no error and relinquish control. As briefly discussed under RECEIVE CODING EQUIPMENT OPERATING CONDITION CHECK SEQUENCE, AND Gate 115 detects the occurrence of the Alarm Indicator and Operate Indicator line negative voltage activation through Emitter Followers 106 and 107 respectively and outputs positively to OR Gate 122. This positive voltage is applied to OR Gate 122 and directed as a positive voltage to AND Gate 133 which has been enabled by the lack of a negative voltage on the remaining terminals 7, 8 and 9. AND Gate 133 thereupon outputs negatively to OR Gate 137 to initiate another RESET-START SEQUENCE.

In addition, a 10 to 200 microsecond transient may occur on the Operate Indicator lines 16a and 33a of both Coding Equipments when the Reset Relays pull in. This is observed by AND Gate 116 and would cause a false activation of Verification Counter 114. However, Flip-Flop 131 is turned on by the positive Reset Command pulse from OR Gate 137 to terminal 20 of Flip-Flop 131 and is turned off by the positive START Command pulse from AND Gate 134 applied to terminal 12 of Flip-Flop 131. Flip-Flop 131 when turned on by the positive Reset Command pulse on its terminal 20 outputs positively on its terminal 14 to apply a positive voltage to terminal 2 of AND Gate 116 which inhibits it during the period of the Reset Relays' pull in.

Transients may also occur on the Alarm Indicator line 19a of the present embodiment, at the time Reset Relay 68a pulls in. These transients are inhbiited by the positive output of One Shot 141 on its terminal 12 applied to inhibit terminal 9 of AND Gate 142.

The complete operating cycle of the duplex system shown in FIGS. 4a, 4b and 4c will now be described. Where the words local and remote and letters a and b are used they refer to equipment at the local station 27 and the remote station 11 respectively.

When power is turned on at both stations by the station operators, both the local and remote Checkers and Automatic Synchronizers assume control over the Coding Equipments at their respective stations because the local and remote Control Flip-Flops 180 go on, Alarm Check Flip-Flops 144 go on, Received Data Flip-Flops 78 go on, and RESET-START SEQUENCE is initiated as described under POWER TURN-ON SEQUENCE. Initially then, data is gated off from the Transmit Coding Equipments 14a by the inhibits on AND Gate 197 and the output of each Transmit Coding Equipment is blocked off by the Alarm Check Relays 69a.

Each Checker and Automatic Synchronizer 70 starts off independently by performing its own Alarm Check. A Reset Command is issued to each Coding Equipment at that station and the Reset Relays 67a and 68a close to reset the circuitry of both coding equipments. The Reset Command turns off Received Data Flip-Flop 78 and cuts off data to Receive Coding Equipments 31a. The Reset Indicator lines 15a go on and after a 128 bit plus 50 millisecond period, the start line 17a is energized, Reset Indicator line 15a goes out and synchronizing pulses are generated within Transmit Coding Equipment 14a. After a synchronizing period, the Operate Indicator line 16a goes on, followed after a short period of time by the Alarm Indicator line 19a if the internal alarm circuitry in Transmit Coding Equipment is working properly. When the Alarm Indicator line 19a goes on, it turns off the Alarm Check Flip-Flop 144 which opens Alarm Check Relay 69a and removes the block from the output of Transmit Coding Equipment 14a.

If the internal alarm circuitry is not working properly, the Alarm Indicator line 19a will not go on, the block will not be removed from Transmit Coding Equipment 14a, and after 4096 bits the Time Delay Counter 190 will output to turn on the Master Alarm Flip-Flop 178 and the Master Alarm 172.

Assuming the internal alarm circuitry is in proper working order 100 milliseconds after Alarm Check Flip-Flop 144 is turned off, a new RESET-START SEQUENCE is initiated and a new Reset Command is issued to the local Coding Equipments 14a and 31a. The constant level Reset Command signal goes out over the line through the remote Receive Demodulator 28b into the remote Checker and Automatic Synchronizer 70b, where it is sensed by the remote Reset Counter 100 which outputs after 64 bits to turn Received Data Flip-Flop 78 on. If the Remote Station 11 is in operation at the time the synchronizing procedure is initiated by the local Checker and Automatic Synchronizer 70a, the Control Flip-Flop 180 would not be on and the negative going leading edge pulse output of the remote Reset Counter 100 would initiate through remote OR Gate 137 a Reset Command in the remote Transmit Coding Equipment 14b 64 bits after the one which started it from the local Transmit Coding Equipment 14a. The output of remote OR Gate 137 turns off the remote Received Data Flip-Flop 78, but one-half bit later the positive going trailing edge of the pulse output of the remote Reset Counter 100 turns Flip-Flop 78 back on. The remote Transmit Coding Equipment 14b is now transmitting its own Reset Command signal through Transmit Modulator 24b and over line 25b through Receive Demodulator 28a into the local Checker and Automatic Synchronizer 70a.

This constant level Reset Command return signal is recognized by the Reset Counter 100 at the local station and after counting 64 bits, it outputs to turn the local Received Data Flip-Flop 78 back on again. At this point both Transmit Coding Equipments (local and remote) are sending Reset Command signals to the transmission line and both Receive Coding Equipments are permitted to receive these signals since AND Gates 73 on both Checkers and Automatic Synchronizers 70a and 70b are open.

The two Transmit Coding Equipments 14a and 14b will then receive START commands from their respective Checker and Automatic synchronizer 128 bits and 50 milliseconds after their Reset Commands as described under the RESET-START SEQUENCE and they will commence transmitting synchronizing pulses. After transmitting synchronizing pulses, the two Transmit Coding Equipments proceed into operation with their respective Operate Indicators 16a and 16b turning on. The Receive Coding Equipments also proceed into operation with their respective Operate Indicators 33a and 33b turning on at the instant the Transmit Coding Equipments go into operation.

As the Operate Indicator line 16a in each Transmit Coding Equipment 14a and 14b goes on, it initiates the RECEIVE CODING EQUIPMENT OPERATING CONDITION CHECK SEQUENCE. If within 80 milliseconds plus 128 bits after the Operating Indicator line 16a goes on in the Transmitter, the Operating Indicator line 33a in the Receive Coding Equipment at the same station goes on and there are no Alarms in either the Transmit Coding Equipment or the Receive Coding Equipment at that station, the system will proceed into the SYNCHRONIZATION VERIFICATION SEQUENCE. If, however, within this 80 millisecond plus 128 bit OPERATING CONDITION CHECK SEQUENCE one of these conditions occur, a new RESET-START SEQUENCE and corresponding synchronizing procedure will be initiated.

At the time that the Operate Indicator lines 16 and 33 go on in both the Transmit Coding Equipment and the Receive Coding Equipment 14 and 31 respectively at one station, the SYNCHRONIZATION VERIFICATION SEQUENCE is initiated at that station. The signal output of each Receive Coding Equipment 31a and 31b is monitored over line 49a and 49b by the respective Checker and Automatic Synchronizer 70a and 70b. Since AND Gates 197 of both Checkers and Automatic Synchronizers are blocked, no information from either Transmit Terminal Equipment 12a or 12b is being transmitted over the system at this time even though all Coding Equipments are in operation. Therefore there should be no data level signals appearing over either line 49a or 49b if the Receive Coding Equipment has been synchronized with the Transmit Coding Equipment at the other end of the line. If during the 15 bit output period of Verification Counter 114 from the time that both Operate Indicator lines 16a and 33a go on, no data transmissions are observed at the output of Receive Coding Equipment 31a on line 49a then the output of Verification Counter 114 will turn off Control Flip-Flop 180 and remove the inhibit from AND Gate 197 allowing it to conduct information from Terminal Equipment 12a to Transmit Coding Equipment 14a. When this occurs at both stations, then each Checker and Automatic Synchronizer relinquishes control of its link end of the duplex system. If, however, any data transmissions are received from the output of the respective Receive Coding Equipment 31 over line 49, during the 15 bit verification period, it indicates the Transmit Coding Equipment on the other end of the line is out of synchronism with that Receive Coding Equipment and AND Gate 168 is enabled by the data signal and the output of Verification Counter 114 at the end of the 15 bit synchronization verification period is switched to turn on Master Alarm Flip-Flop 178 and to initiate a new RESET-START SEQUENCE. Control Flip-Flop 180 will stay on and the inhibit will remain on AND Gate 197. So long as the malfunction exists and data transmissions are received over line 49, the Master Alarm will stay on and the Checker and Automatic Synchronizer will continuously attempt to resynchronize the line on which the data transmission appears. When the malfunction disappears the output of the verification counter will turn off Control Flip-Flop 180 and allow data transmission from the respective Transmit Terminal Equipment.

FIG. 7 shows a timing diagram of the complete cycle from the time that the Reset Command first goes over the line to the Local Station 27.

FIG. 8a is a schematic diagram of the Dual One Shot Multivibrator and FIG. 8b is the functional block symbol representing this circuit in FIGS. 4a, 4b and 4c.

The circuit is a monostable multivibrator that has both pulse and delay outputs available. The pulse output (positive pulse) provides a pulse that occurs on a positive transition at the input to the One Shot. The delay output is also triggered with a positive transition at the input but provides a delay period (negative pulse). The period of both pulse and delay outputs is fixed by selecting a suitable jumpering capacitor C1, C2, C3 or C4 whose positive output end shown as plus is connected to the D.C. input. The duration of the output period is as follows:

| | |
|---|---|
| C1 - 40 to 160 milliseconds | (25 mfd) |
| C2 - 9.5 to 42 milliseconds | (6 mfd) |
| C3 - 2 to 10 milliseconds | (1.6 mfd) |
| C4 - 1 to 4 milliseconds | (0.5 mfd) |

Or external capacitors may be connected in the same manner to provide periods of approximately 2 to 8 ms/mfd.

The resistors making up a voltage dividing network between the +V and −V supplies effectively forward biases the emitter to base junction of both transistors but the 3.9K resistor constitutes a direct D.C. coupling between the collector of the left or first transistor and the base of the right or second transistor. Hence during the quiescent period the first transistor goes into saturation, this places its collector effectively at ground and as a result the base of the second transistor is maintained at some positive value through the network of the 3.9K ohm resistor and 22K ohm resistor which is connected to the +V supply. At the quiescent point therefore, the second transistor is reverse biased and cut off and the output of the One Shot on terminals 10 or 12 is at a constant level of −V. During the quiescent period, whichever capacitor C1, C2, C3 or C4 is used is charged to the polarities shown from ground through the low resistance emitter to base junction of the first transistor to the −V supply.

Input signals on terminals 2 and 21 are coupled to the One Shot through the 0.001 mfd. capacitor so that only a.c. signals reach the junction of the 5.1K ohm resistor and the diode. The 0.001 mfd capacitor and 5.1K ohm resistor differentiate the pulse to provide negative and positive going peaks but the polarity of the diode is such that only the positive going peaks reach the base of the first transistor. When the differentiated positive peak at the base reaches a level to reverse bias the emitter-base junction of the first transistor it cuts the first transistor off. The collector voltage falls negatively and this negative voltage is coupled through the 0.01 mfd capacitor and 3.9K resistor to the base of the second transistor, forward biasing it. The second transistor goes into saturation, its collector voltage rises from −V to ground. The capacitor C1, C2, C3 or C4 as the case may be which has previously been charged to almost the −V voltage now starts to discharge through the 5K ohm and 1.5K ohm resistors. When they discharge they make the base of the first transistor more negative until ultimately, the positive signal having passed, the first transistor conducts and cuts off the second transistor as described before. The period of the One Shot is determined by which of the capacitors C1, C2, C3 or C4 is used and the setting of the Fine Period Adjust. A negative output of a period corresponding to the positive output period may be obtained from the collector of the first transistor.

FIG. 9a is a schematic diagram of the Relay and FIG. 9b is the functional block symbol of the single pole, double throw relay contacts, FIG. 9c is the functional block symbol of the single pole, single throw relay contacts and FIG. 9d is the functional block symbol of the relay coil representing these components in FIGS. 4a, 4b and 4c.

The circuit contains a 10 pole relay consisting of 8 poles normally open and 2 poles normally closed. It is used as a remotely controlled auto/manual by-pass switch.

FIG. 10a is a schematic diagram of the ÷ 16 Binary Counter and FIG. 10b is the functional block symbol representing this circuit in FIGS. 4a, 4b and 4c. The circuit contains a four-stage binary counter. Each stage operates exactly similar to the Flip-Flop shown in FIG. 13a when it is connected as a binary flip-flop with positive pulse steering. The only differences are in the values of the parameters used. The outputs from both normal and inverted outputs of each stage are available and so the circuit can be used as a 2, 3, or 4 stage counter.

All values of Flip-flops are the same as for the first Flip-Flop.

The operation of each stage has been explained for FIG. 13c. One D.C. reset line terminating in terminal 20 is connected through 16K resistor to the base of the right hand transistor in each stage. Hence a negative reset pulse applied to terminal 20 will forward bias the right hand transistor in each stage and put them into saturation by which condition each of the left hand transistors of each stage will be cut off. One stage triggers and succeeding stage by direct coupling from the collector of the right hand transistor of one stage to the A.C. input of the succeding stage. The succeeding stage will therefore only be flipped when the right hand transistor of the preceding stage goes from non-conducting to conducting, i.e., coupling a positive pulse to the next stage. A negative pulse input will have no effect because both of the diodes of the succeeding stage will be reverse biased. When a positive pulse is applied, however, it will conduct to the negative base of the saturated transistor because that diode through which it conducts is forward biased while the other diode connected to the positive base of the cut off transistor is reverse biased. Since there is an output from the collector of each transistor in the Binary Counter, individual counts from 0 to 15 are available.

FIG. 11a is a schematic diagram of the Emitter-Follower and FIG. 11b is the functional block symbol representing this circuit in FIGS. 4a, 4b and 4c.

The circuit is a grounded collector amplifier, more commonly known as an Emitter Follower. The output is in phase with the input which can be either plus or minus, although there is some loss of level. Because the power gain of the stage is approximately 20, it is used as a buffer element isolating the circuit connected to the base from the collector-emitter output circuit.

FIG. 12a is a schematic diagram of the Pulse Gate and FIG. 12b is the functional block symbol representing this circuit in FIGS. 4a, 4b and 4c.

The network is a pulsed "AND" Gate. When a positive level (ground) is connected to the resistor and a positive pulse is applied to the capacitor, a positive pulse output is obtained at the diode. If the resistor is connected to a negative level, no output will appear because the capacitor will not be able to charge. This type of gate is useful in setting or resetting a flip-flop or other pulse type circuit.

FIG. 13a is a schematic diagram of the Flip-Flop shown in functional block symbols in FIGS. 4a, 4b and 4c. FIG. 13b is the functional symbolic block representing the circuit of FIG. 13a connected as a set-reset flip-flop and FIG. 13c is the functional symbolic block representing the circuit of FIG. 13a connected as a binary flip-flop.

The Flip-Flop is a basic Eccles-Jordan bistable multivibrator. It can be used as a binary flip-flop by connecting the two capacitor inputs together giving it positive pulse steering, or as a set-reset flip-flop by connecting the set pulse to one input capacitor and and the reset pulse to the other input capacitor. Additional pulse gate inputs and direct resetting of a flip-flop are provided. It should be noted that jumpers not shown should connect terminals 7 to 10, 5 to 2, 15 to 13 and 17 to 21.

With the initial application of D.C. power, one transistor will be caused to turn on while the other will be cut off. Assuming the transistor on the right hand side is saturated, its collector voltage will rise to ground potential. Because of the voltage dividing network of the 3.9K ohm and 120K ohm resistors from the collector of the right hand transistor at 0 volts to the +V supply, the base of the left hand resistor is positive and the emitter base junction is reverse biased to cut off the left hand transistor. Assuming that a positive D.C. pulse is applied to terminals 17 or 5 or a positive going A.C. pulse edge is applied to terminals 3 or 20, it will reduce the forward bias of the right hand transistor and conduction will begin to decrease. This will cause the collector current to decrease and the collector voltage will change from zero to a negative value. The voltage decrease will be coupled through the 82 mmfd capacitor and 3.9K resistor to the base of the left hand transistor thus forward biasing the left transistor and causing it to conduct. The regenerative feedback continues until the left transistor is in saturation and the right hand transistor is cut off. Of course a negative D.C. voltage applied to terminals 7 or 15 and a negative going pulse edge applied to terminals 11 or 12 will have the same effect. The outputs are taken off the collector of each transistor.

So that the Flip-Flop may be triggered on and off repeatedly with input pulses of the same polarity, to operate as a binary or ÷2 Flip-Flop, the two A.C. inputs are connected together, i.e., terminal 11 connected to terminal 3 of Section A is used and terminal 12 is connected to terminal 20 if section B is used. When a positive pulse is applied to the anode side of the two DR435 diodes, the diode connected to the ON transistor whose base is negative, will be forward biased. Hence the positive pulse will get through to the ON transistor making its base positive and causing it to decrease conduction. As its collector voltage falls negatively, the negative going voltage is coupled to the base of the other transistor causing it to go into conduction and ultimately saturation while the originally conducting transistor is cut off.

FIGS. 14a is a schematic diagram of the Bipolar Schmitt Trigger shown in functional block symbols in FIGS. 4a, 4b and 4c. FIG. 14b is the functional symbolic block of the Schmitt Trigger Circuit.

The circuit is basically a Schmitt Trigger with two stages of amplification and has both normal and complementary outputs available. The trigger level of the circuit is variable over a 6 volt range. When the input is above the set trigger level, the normal output is at ground, but when the input level is below the trigger level the normal output is at −12 volts.

The trigger level adjust potentiometer is set at a level such that the voltage divider network composed of the 1.3K ohm, 11K ohm, 6.8K ohm and potentiometer resistance across the +V to −V line forward biases the base of the second transistor from the left which goes into saturation, its output collector voltage rising to approximately the potential of the emitter. At the quiescent condition with no input on the base of the left hand or first transistor, the first transistor is cut off and its collector voltage is −V. This negative voltage is coupled to the base of the second transistor through the 11K resistor keeping it negative. Current flow from the +V supply through the common-emitter 3.3K ohm resistor and the emitter of the second transistor maintain the emitter of the first transistor at a negative potential which produces a reverse bias between the emitter and the base of the first transistor which in the absence of a signal is at ground potential.

When a negative signal of sufficient amplitude, i.e., below the trigger level set by the Trigger Level Adjust, is applied to the base of the first transistor, it will overcome the reverse bias and cause the first transistor to conduct. The potential at the collector of the first transistor becomes less negative and this positive going voltage is coupled to the base of the second transistor through the 82 mfd capacitor and 11K resistor. The emitter current of the second transistor decreases lowering the potential across the 3.3K ohm resistor and consequently making the emitter of the first transistor more positive, decreasing the reverse bias and increasing the collector current until the first transistor is saturated and the second is cut off when the output at the collector of the second transistor becomes the −V voltage. This condition continues until the input voltage begins to rise which decreases the base potential and increases the reverse bias on the emitterbase junction of the first transistor. This causes the collector voltage to become more negative with decrease in emitter current. The decreasing collector voltage is coupled to the base of the second transistor making it more negative and causing it to conduct, thus more current goes through the 3.3K ohm resistor making the emitter of the first transistor more negative until the second transistor is in saturation and the first is cut off as in the original operating conditions. Since the common-emitter coupling resistor provides a very fast switching time the output pulse is a rectangular negative wave whose pulse width is the time in which the input wave was below the trigger level, and is not dependent upon the shape of the input wave. This rectanuglar negative output pulse from the collector of the collector of the second transistor is fed to the base of the third transistor.

In the quiescent condition and when the second transistor is cut off the third transistor is cut off because its base is held at −V voltage through the 620 ohm resistor. However, when the second transistor is conducting and the collector voltage rises, the base of the third transistor is turned on. Hence the output of the third transistor which is coupled to the base of the fourth transistor through the 82 mfd capacitor and 3.9K resistor goes from ground to negative values. The fourth transistor is cut off in the quiescent condition because its base is positive and reverse biased through the voltage divider composed of the 620 ohm, 3.9K ohm and 1.6K ohm resistor. However, as the third transistor conducts, the negative signal coupled from its collector to the base of the fourth transistor forward biases the fourth transistor and it starts to conduct. The normal output of the fourth transistor which is in phase with the input signal due to an even number of stages of amplification is taken from the collector on terminals 11 and 13. A complementary output 180 degrees out of phase with the input signal is taken from the output of the third stage at terminals 3 and 21.

FIG. 15a is a schematic diagram of the negative "OR" Inverter shown in functional block symbols in FIGS. 4a, 4b and 4c. FIG. 15b is the functional block symbol representing the circuit of FIG. 15a operating as an AND Gate, FIG. 15c is the functional block symbol representing the circuit of FIG. 15a operating as an OR Gate, and FIG. 15d is the functional block symbol representing the circuit of FIG. 15a operating as an Inverter.

The circuit consists of a negative "OR" diode gate that feeds an inverting amplifier. When any input to the "OR" Gate is negative, the output of the amplifier is positive. When all inputs to the "OR" Gate are positive or there are no inputs to the "OR" Gate, the output of the amplifier is negative, thus providing a positive "AND" function with inversion.

Initially with no signal at the cathode of any of the diodes and the circuit connected to the power supply as shown, the base of the transistor is at a +V which reverse bias the emitter-base junction and cuts off the transistor. The collector from which the output is taken is then at -V voltage. If a positive signal is applied to any or all of the diodes, the diodes themselves are reverse biased and do not conduct and therefore the level of the transistor base remains positive so the transistor is still cut off and its output remains negative. Hence with all inputs to the OR Gate positive or all inputs floating or a combination of the two, the output of the amplifier is negative thus providing the positive "AND" function with inversion.

With a negative signal at any or all of the cathodes of the diodes, current flows from the most negative input supply through the 3.9K resistor to the base of the transistor causing it to conduct at which time the collector voltage rises to ground. Therefore a positive output is obtained when any or all inputs to the OR Gate are negative.

The circuit also can be used as an inverter for single signals, for as explained previously a single positive input will produce a negative output and a single negative input will produce a positive output.

FIG. 16a is a schematic diagram of the negative "AND" Inverter shown in functional block symbols in FIGS. 4a, 4b and 4c. FIG. 16b is the functional block symbol representing the circuit of FIG. 16a operating as an AND Gate, FIG. 16c is the functional block symbol representing the circuit of FIG. 16a operating as an OR Gate, and FIG. 16d is the functional block symbol representing the circuit of FIG. 16a operating as an Inverter.

The circuit consists of a negative "AND" diode gate that feeds an inverting amplifier. When all inputs to the "AND" Gate are negative or there are no inputs to the "AND" Gate, the output of the amplifier is positive. When any input to the "AND" Gate is positive, the output of the amplifier is negative, thus providing a positive "OR" function with inversion.

Initially with no signal at the anode of any of the diodes and the circuit connected to the power supply as shown, the base of the transistor is held at a negative voltage through the voltage divider composed of the 2.7K ohm resistor, the 1.5K ohm resistor and the 13K ohm resistor. This forward biases the emitter-base junction of the transistor which goes into saturation. The collector voltage rises to ground potential due to the low resistance between emitter and collector in the saturated state. With a negative signal at one of the anodes of the diodes or at all of the anodes of the diodes, the diodes are reverse biased and the signal does not get through, so the output of the amplifier remains at ground. Hence with all inputs to the AND Gate negative or all inputs floating or a combination of the two, the output of the amplifier is positive thus providing the negative "AND" function with inversion.

With a positive signal at any or all of the anodes of the diodes, they are forward biased and the positive signal is coupled to the base of the transistor through the 500 mmfd capacitor and 1.5K resistor making the base positive. With the base positive, the emitter-base junction is reverse biased and the transistor is cut off. When the transistor cuts off, its output falls to the −V voltage, thus providing a positive "OR" function with inversion.

The circuit also can be used as an inverter for single signals for as explained above a single positive input will produce a negative output and a single negative input will produce a positive output.

FIG. 17a is a schematic diagram of the 10 circuit Indicator Driver shown in functional block symbols in FIGS. 4a, 4b and 4c. FIG. 17b is the functional block symbol of the circuit of FIG. 17a.

The circuit consists of 10 individual circuits with a common power supply. Each individual circuit consists of a transistor driver with a voltage divider circuit feeding its base from its input and a single Indicator as its load. FIG. 18a is a schematic diagram of the 2 Indicator Driver shown in functional block symbols in FIGS. 4a, 4b and 4c. FIG. 18b is the functional block symbol of the circuit of FIG. 18a.

Essentially this is the same circuit as that shown in and explained for FIG. 17a except for the fact that this card contains a smaller number of circuits.

FIG. 19a is a schematic diagram of the Time Delay shown in functional block symbols in FIGS. 4a, 4b and 4c. FIG. 19b is the functional block symbol of the circuit of FIG. 19a.

The load is applied across the 100 mfd capacitor when D.C. power is first connected to terminals 1 and 23 as shown, current first flows through the 3.6K ohm resistor to charge the 100 mfd capacitor and does not output on terminal 11 to the load until the capacitor has charged for the fixed delay period determined by the time constant of the RC network. When power is turned off the diode furnishes a low resistance fast return path to ground to discharge the capacitor.

FIG. 20a is a schematic diagram of the Relay Driver shown in functional block symbols in FIGS. 4a, 4b and 4c. FIG. 20b is the functional block symbol of the circuit of FIG. 20a.

The Relay Driver is an emitter follower with the input applied to its base that feeds an inverter capable of driving 200 ma into 18 volts.

FIG. 21a is a schematic diagram of the Logic Inverter shown in functional block symbols in FIGS. 4a, 4b and 4c. The logic inverter provides buffering between logic levels of the Checker and Automatic Synchronizer 70 connected to its input and those associated with other equipments which it drives on its output.

FIG. 22 is a logical diagram of Checker and Automatic Synchronizer 40 at the Remote Station 11 as shown in the Simplex or One Way System of FIG. 2, and FIG. 23 is a logical diagram of Checker and Automatic Synchronizer 45 at the Local Station 27 also shown in FIG. 2. Since the theory of operation of the Simplex System is almost identical to that for the Duplex System, the functional blocks of FIGS. 4a, 4b and 4c have been combined wherever possible into the composite blocks of FIGS. 22 and 23 for simplicity. Where identical blocks are used, they bear identical numbers to those shown in FIGS. 4a, 4b and 4c.

As in the description of the Duplex System, the operation of the Simplex System will be described in terms of the operation of the various sequences.

POWER TURN-ON SEQUENCE

Checker and Automatic Synchronizer 45:

When power is turned on, −12 volts is applied through the set of resistors 81 to turn on Received Data Flip-Flop 78 and Control Flip-Flop 180 and to turn off Master Alarm Flip-Flop 178. Block 249 represents the power turn-on circuitry shown in FIGS. 4a, 4b and 4c which outputs through resistors 81 to reset the flip-flops, the letter "R" representing reset. Power Turn-On Time Delay Block 258 represents the circuitry which in FIGS. 4a, 4b and 4c is shown as Time Delay 125, Relay 126, Pulse Gate 152, One Shot 148, One Shot 149 and Inverter 150 and successively outputs to OR Gate 278.

Checker and Automatic Synchronizer 40:

When power is turned on, −12 volts is applied through the set of resistors 81 to turn on Control Flip-Flop 180 and Alarm Check Flip-Flop 144 and to turn off Master Alarm Flip-Flop 178. Block 249 represents the power turn-on circuitry shown in FIGS. 4a, 4b and 4c which outputs through the resistors 81 to reset the flip-flops, the letter "R" representing reset. When Control Flip-Flop 180 turns on, the output from the shaded side inhibits AND Gate 264 to block off data from Transmit Terminal Equipment 12. AND Gate 264 represents the functions of Schmitt Trigger 196, AND Gate 197, Inverter 198, Logic Inverter 199 and Relay Contact 195. Power Turn-On Time Delay Block 258 represents the circuitry which in FIGS. 4a, 4b and 4c is shown as Time Dealy 125, Relay 126, Pulse Gate 152, One Shot 148, One Shot 149 and Inverter 150 and successively outputs to OR Gate 257 to initiate a RESET-START SEQUENCE.

RESET-START SEQUENCE

Checker and Automatic Synchronizer 45:

Since the synchronizing pulses are associated with the Transmit Code Equipment, Checker and Automatic Synchronizer 45 is used in conjunction with Order Wire 44 for the START part of this sequence. Any signal to the input of OR Gate 278 such as that applied at power turn-on from Block 258 will cause OR Gate 278 to output to Reset line 32 and reset the internal circuitry of Receive Coding Equipment 31 for the receipt of synchronizing pulses from Transmit Coding Equipment 14 at the opposite end of the line. The output of OR Gate 278 also turns on Control Flip-Flop 180 so that the shaded part outputs in a constant level positive voltage over Order Wire 44 which constitutes the Reset Command to Checker and Automatic Synchronizer 40 at the Remote Station 11. OR Gate 278 represents the circuitry which in FIGS. 4a, 4b and 4c is shown as OR Gate 137, One Shot 141, Indicator Driver 136 and Relay Contact 108.

Checker and Automatic Synchronizer 40:

Any signal to the input of OR Gate 257 or OR Gate 261 will initiate the RESET-START SEQUENCE. However, since the continuity of the discussion implies that the RESET-START SEQUENCE was initiated at Local Station 27 and that there is a positive constant level Reset Command on Order Wire 44 from the Local Station 27, it will be assumed that this initiates the RESET-START SEQUENCE at the Remote Station 11. The Reset Command Signal enables the right hand input of AND Gate 251 which thereupon outputs with the subsequent clock pulse from Transmit Modulator 24 over line 43. AND Gate 251 outputs to AND Gate 253. If Transmit Coding Equipment 14 is in the operating condition at the time, then the right hand input of AND Gate 253 will be enabled by the energized state of Operate Indicator line 16. This will normally be the case, as the sequence is assumed to be initiated from the other station. If the Transmit Coding Equipment 14 were already going through a RESET-START SEQUENCE then there would be no need to initiate another one and the absence of a signal from the Operate Indicator Line 16 would prevent it. For the same reason Control Flip-Flop 180 would normally be off, and the output from the unshaded side of the flip-flop would enable the second input from the left of AND Gate 253. There would be no inhibit on the left hand input of AND Gate 253 unless the Alarm Indicator line 19 was energized indicating a malfunction in the Transmit Coding Equipment 14. Hence when AND Gate 251 outputs, it causes AND Gate 253 to output to OR Gate 261.

AND Gate 251 which has no counterpart in FIGS. 4a, 4b and 4c requires that the Reset Command over Order Wire 44 be synchronized with a clock pulse input and minimizes the possibility of spurious triggering of OR Gate 261 due to noise on the Order Wire 44. AND Gate 253 corresponds to AND Gate 132 in FIGS. 4a, 4b and 4c. OR Gate 257 replaces input terminal 3 of OR Gate 137 in FIGS. 4a, 4b and 4c while OR Gate 261 replaces terminals 2, 4 and 5 of OR Gate 137. After OR Gate 261 outputs to Reset Line 18 to reset the internal circuitry of Transmit Coding Equipment 14, Reset Indicator line 15 is energized which turns Control Flip-Flop 180 to the ON condition as represented by the shaded side. Control Flip-Flop 180 outputs to enable the middle input to AND Gate 260. The top input of AND Gate 260 has also been enabled by the energizing of Reset Indicator Line 15. Therefore, when the constant level output of Control Flip-Flop 180 at Local Station 27 appears on Order Wire 44, it is applied to the bottom input of AND Gate 260 causing AND Gate 260 to output to enable the top input of AND Gate 255. With AND Gate 255 enabled, it passes clock pulses from Transmit Modulator 24 over line 43 to Counter 263. Counter 263 represents the functions of a fixed plus a variable time delay. As AND Gate 256 is also enabled by the energizing of Reset Indicator line 15 on its top terminal, when Counter 263 counts, it outputs to AND Gate 256 which in turn outputs to Start line 17, and Transmit Coding Equipment 14 thereupon sends synchronizing pulses over line 25 through Receive Demodulator 28 and out line 47 to Checker and Automatic Synchronizer 45 at Local Station 27. AND Gate 260 of FIG. 22 includes the functions of Emitter Follower 145, AND Gate 139, Pulse Gate 95 and Flip-Flop 88 of FIGS. 4a, 4b and 4c. AND Gate 255 of FIG. 22 represents the functions of Schmitt Trigger 71 and AND Gate 89 of FIGS. 4a, 4b and 4c.

ALARM CHECK SEQUENCE AND TIME DELAY

Since the ALARM CHECK SEQUENCE is associated with the Transmit Coding Equipment only, no provisions for this sequence are required in Checker and Automatic Synchronizer 45 of FIG. 23. As described under the POWER TURN-ON SEQUENCE, Alarm Check Flip-Flop 144 is represented by the shaded side in FIG. 22. When Alarm Check Flip-Flop 144 is turned on it outputs over line 20 to the Alarm Check Relay not shown in FIG. 22. From that point on the operation of Transmit Coding Equipment 14a is exactly as described for the Duplex System previously. When the Alarm Indicator Line 19 is energized at the successful conclusion of an Alarm Check, it outputs to both the shaded and unshaded side of Alarm Check Relay 144. This output will, however, have no effect on the particular transistor represented by the unshaded side which is already in the condition which it would normally take in response to a signal of the polarity existing upon the energization of Alarm Indicator Line 20. However, the signal applied to the shaded side of Alarm Check Flip-Flop 144 will cause it to reverse its state and flip over to output from its unshaded side, thus de-energizing the Alarm Check Relay over line 20 and removing the block from the output of Transmit Coding Equipment 14 as well as disabling AND Gate 259. Of course if the Alarm Indicator Line 19 does not go on at the conclusion of the ALARM CHECK SEQUENCE, then the shaded side continues to output and enables AND Gates 259 and 262, so that AND Gate 262 passes clock pulses to Time Delay Counter 190. If the Alarm Check Flip-Flop 144 is not turned off before 4096 clock pulses are counted then Time Delay Counter 190 will output to AND Gate 259 which will output in turn to turn on Master Alarm 178. If while the system is in operation, which implies that Alarm Check Flip-Flop 144 is off, an alarm should occur then Alarm Indicator line 19 will be energized and the Alarm Check Flip-Flop 144 will be turned on, i.e., shifted to the shaded side. When the Alarm Indicator line 19 goes on, it also initiates a RESET-START SEQUENCE through OR Gate 257. AND Gate 262 in FIG. 22 represents the functions of AND Gate 191 in FIGS. 4a, 4b and 4c. AND Gate 259 represents the functions of Emitter Follower 189, AND Gate 187, Resistor 188 and Pulse Gate 186. The line from the Alarm Indicator Line 19 to Alarm Check Flip-Flop 144 in FIG. 22 would also represent the functions of Emitter Follower 155, AND Gate 142 and One Shot 143 in FIGS. 4a, 4b and 4c.

SYNCHRONIZATION VERIFICATION SEQUENCE

The RECEIVE CODING EQUIPMENT OPERATING CONDITION CHECK SEQUENCE, as such, is not provided for in the Simplex System. The SYNCHRONIZATION VERIFICATION SEQUENCE is initiated in both Checkers and Automatic Synchronizers 45 and 40 by the energization of the Operate Indicator lines 33 and 16 and if either of these lines fail to become energized, the respective Control Flip-Flops 180 will not release control of the system.

Checker and Automatic Synchronizer 45:

When in FIG. 23 operate Indicator line 33 is energized, it triggers Flip-Flop 167 to the shaded side and it enables AND Gate 273 which passes clock pulses to Verification Counter 114. Remembering that Transmit Terminal Equipment 12 on the opposite end of the line has had its output blocked by the inhibit placed on AND Gate 264 when Control Flip-Flop 180 was turned on, there should be no data appearing over line 49 as explained for the Duplex System. If no data appears on line 49, then AND Gate 272 will not conduct and Flip-Flop 167 will remain on the shaded side, hence there will be no output from the unshaded side and AND Gate 276 will not conduct. The output from the shaded side of Control Flip-Flop 180 and the output from the shaded side of Flip-Flop 167 will enable AND Gate 277 and when Verification Counter 144 outputs at the end of 15 clock pulses, AND Gate 277 will output to turn off Master Alarm Flip-FLop 178 and Control Flip-Flop 180 thus removing the positive constant level voltage from Order Wire 44.

If, however, data is received on line 49 during the period when Verification Counter 114 is counting, AND Gate 272 which has been enabled by the shaded side of Control Flip-Flop 180 in the ON condition will output to flip Flip-Flop 167 over to the unshaded side. When Flip-Flop 167 goes over to the unshaded side, it disables AND Gate 277 and enables AND Gate 276 which is also enabled by the output from the shaded side of Control Flip-Flop 180. When Verification Counter 114 outputs now it will cause AND Gate 276 to output which will turn on Master Alarm Flip-Flop 178 and initiate a new RESET-START SEQUENCE by the middle input of OR Gate 278. The constant level positive voltage will remain on Order Wire 44.

AND Gate 272 in FIG. 23 represents the functions of Schmitt Trigger 169 and AND Gate 168 in FIGS. 4a, 4b and 4c. AND Gate 276 in FIG. 23 represents the functions of AND Gate 185 and Inverter 184 in FIGS. 4a, 4b and 4c. AND Gate 277 in FIG. 23 represents the functions of Inverter 113, AND Gate 121 and AND Gate 170 in FIGS. 4a, 4b and 4c.

Checker and Automatic Synchronizer 40:

When Operate Indicator line 16 is energized, it enables AND Gate 250 on its top input which therefrom passes clock pulses to Verification Counter 144. At the 15th clock pulse, Verification Counter 114 outputs to AND Gate 252 which has been enabled by the shaded side output of Control Flip-Flop 180. AND Gate 252 outputs to turn Control Flip-Flop 180 off, i.e., to the unshaded side. This enables the second input from the left of AND Gate 253. The right input was enabled when Operate Indicator line 16 was energized and presumably there was no inhibit on the left hand input because there was no signal on the Alarm Indicator line 19. Now if the Control Flip-Flop 180 at the opposite end of the line in Checker and Automatic Synchronizer 45 is still on, there will be an enabling voltage on Order Wire 44 which will be applied through AND Gate 251 to the third input from the left of AND Gate 253 and this AND Gate will conduct to OR Gate 261 thus initiating a RESET-START SEQUENCE. Of course, if the Control Flip-Flop 180 at the other end of the line has been turned off, there will be no enabling voltage on the second input of AND Gate 253 and it will not output.

AND Gate 250 in FIG. 22 represents the functions of Emitter Follower 146, AND Gate 116, Flip-Flop 117 and AND Gate 118 of FIGS. 4a, 4b and 4c. AND Gate 252 of FIG. 22 represents the functions of Flip-Flop 167, Inverter 113, AND Gate 121, and AND Gate 170 in FIGS. 4a, 4b and 4c.

OPEN LINE DETECTION SEQUENCE

Checker and Automatic Synchronizer 45:

When a Reset Command is issued by OR Gate 278, it turns Received Data Flip-Flop 78 off, i.e., to the unshaded side, where it remains until Reset Counter 100 counts 64 clock pulses from Receive Demodulator 28 without being reset by a change in signal level sensed over line 47. So long as Received Data Flip-Flop 78 remains on the unshaded side or off, AND Gate 270 is disabled and data does not get through to Receive Coding Equipment 31. When Reset Counter 100 does output after counting 64 clock pulses from line 46 without being reset, it turns Received Data Flip-Flop 78 back on to the shaded side, thus enabling AND Gate 270 and allowing data to enter Receive Coding Equipment 31 over line 48. The output of Reset Counter 100 will also cause OR Gate 274 to output to the left input of AND Gate 275. If Control Flip-Flop 180 is already on, indicating that Checker and Automatic Synchronizer 45 is already going through a RESET-START SEQUENCE, then AND Gate 275 will not conduct. However, if Control Flip-Flop 180 is off, i.e, on the unshaded side, then AND Gate 275 will conduct to initiate a RESET-START SEQUENCE. Line 47 of FIG. 23 represents the functions of Schmitt Trigger 72 in FIGS. 4a, 4b and 4c. Line 46 of FIG. 23 represents the functions of Schmitt Trigger 71. AND Gate 270 in FIG. 23 represents the functions of AND Gate 73, AND Gate 74, Logic Inverter 75 and Relay Contact 76 of FIGS. 4a, 4b and 4c. OR Gate 274 in FIG. 23 represents the functions of OR Gate 110 in FIG. 4b.

REMOTE RESYNCHRONIZATION

A RESET-START SEQUENCE can be initiated by a remote command to OR Gate 274 in FIG. 23. Remote Resynch Block 271 in FIG. 23 represents the functions of Remote Resynch Block 111, Schmitt Trigger 112, and One Shot 109 in FIGS. 4a, 4b and 4c. Also a RESET-START SEQUENCE can be initiated by a remote command to OR Gate 261 from Remote Resynch Block 279 in FIG. 22.

MISCELLANEOUS

The blocks representing the circuitry to take care of the situation where the Receive Coding Equipment Alarm Indicator line 50a and the Receive Coding Equipment Operate Indicator line 33a go on simultaneously are not illustrated in FIG. 23 as they are amply illustrated in FIGS. 4a, 4b and 4c and described under the operation of the Duplex System.

Receive Checker and Automatic Synchronizer 45 in FIGS. 2 and 23 are shown connected directly to Transmit Checker and Automatic Synchronizer 40 in FIGS. 2 and 22 by an order wire 44. It should be understood that in actual practice some modulating and demodulating equipment would be required at Local Station 27 and Remote Station 11 respectively, either internally or externally to the equipment to implement this connection.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. A one way communication system comprising means for transmitting coded pulse data and synchronizing pulses from a transmitter to a receiver having a source of clock pulses, monitoring means connected to the receiver and responsive continuously to received data for producing an output signal indicative of a malfunction in said system, control means having an input connected to said monitoring means and having an "ON" condition output responsive to said monitoring means output signal and an "OFF" condition output, receiver adjusting means having an input connected to said monitoring means and an output connected to said receiver for readjusting said receiver responsive to said monitoring means output signal, transmitter adjusting means having its output connected to said transmitter for readjusting and instituting corrective action on the transmitter including the blocking of data transmission and the initiation of the transmission of synchronization pulses responsive at its input to the "ON" condition of said control means, a return line connecting the output of said control means to the input of said transmitter adjusting means, and means connecting said receiver to said control means for turning said control means to the "OFF" condition when the malfunction indicated by the output signal of the monitoring means has been corrected, said means for turning the control means "OFF" including means for delaying the turning off of the control means until a predetermined number of pulses free of the effects of the malfunction are received without interruption.

2. A one way communication system comprising means for transmitting coded pulse data signals of varying levels from a transmitter to a receiver having a pulse code demodulator including a source of clock pulses, monitoring means connected to the receiver for continuously detecting the level of such signals and for outputting when said signal level indicates a system malfunction, control means having an input connected to said monitoring means and having an "ON" condition output responsive to said monitoring means output and an "OFF" condition output, receiver adjusting means having an input connected to said monitoring means and an output connected to said receiver for readjusting said receiver responsive to said monitoring means output signal, transmitter adjusting means having its output connected to said transmitter for readjusting and instituting corrective action on the transmitter responsive at its input to the "ON" condition of said control means, a return line connecting the output of said control means to the input of said transmitter adjusting means, said transmitter adjusting means including means responsive to said "ON" condition for causing the transmitter to transmit synchronizing pulses and responsive to said "OFF" condition for terminating the transmission of synchronization pulses to the receiver, and means connecting said receiver to said control means for turning said control means to the "OFF" condition when the malfunction indicated by the output signal of the monitoring means has been corrected.

3. A one way communication system comprising means for transmitting coded pulse data signals of varying levels from a transmitter to a receiver having a pulse code demodulator including a source of clock pulses, monitoring means connected to the receiver for continuously detecting the level of such signals and for outputting when said signal level indicates a system malfunction, control means having an input connected to said monitoring means and having an "ON" condition output responsive to said monitoring means output and an "OFF" condition output, receiver adjusting means having an input connected to said monitoring means and an output connected to said receiver for readjusting said receiver responsive to said monitoring means output signal, transmitter adjusting means having its output connected to said transmitter for readjusting and instituting corrective action on the transmitter responsive at its input to the "ON" condition of said control means, a return line connecting the output of said control means to the input of said transmitter adjusting means, and means connecting said receiver to said control means for turning said control means to the "OFF" condition when the malfunction indicated by the output signal of the monitoring means has been corrected, said monitoring means including a continuously running timing means outputting after an uninterrupted fixed period from its zero time condition and clearing means connected ahead of the receiver for sampling data signal and also being connected to the timing means for resetting it back to its zero time condition in response to a change in level of the data signals.

4. The combination according to claim 3 in which said said timing means and said clearing means include a source of clock pulses, a continuously running counter connected to said clock source for outputting after counting a fixed number of clock pulses, said counter having a reset line, and gating means connected ahead of the receiver for sampling data signals and also being connected to said counter reset line for clearing said counter back to zero responsive to a change in the level of the data signals.

5. In a one way communication system for transmitting coded data between a transmitter and a receiver where the system is synchronized by a synchronizing sequence in which the transmitter and receiver are first reset by actuating transmitter and receiver reset controls and secondly synchronized by actuating a transmitter start control to transmit synchronizing pulses from the transmitter to the receiver, the transmitter having an indicator which is energized when the transmitter is in the reset condition; synchronizing means for automatically performing the synchronizing sequence comprising means located at the receiver for producing a constant level signal; first gating means at the receiver connected to the receiver and said constant level signal producing means for actuating the receiver reset control and causing the constant level signal producing means to put out a constant level signal responsive to a synchronizing sequence command signal applied to said first gating means; sensing means at the transmitter connected to the transmitter reset control for actuating said transmitter reset control thereby energizing the transmitter reset indicator responsive to a constant level input signal; a return line connecting the output of the constant level signal producing means at the receiver to the sensing means at the transmitter; second gating means at the transmitter connected to said reset indicator and responsive to the energizing thereof for outputting to the transmitter start control, said transmitter sending synchronizing pulses to the receiver and synchronizing the system means at the receiver connecting said receiver output to said constant level signal producing means for cutting off said constant level signal responsive to the system coming into synchronization, and means for applying a synchronizing sequence command signal to the first gating means.

6. The combination according to claim 5 further including means for initiating a synchronizing sequence command signal after power is turned on, said initiating means comprising time delay means connected between the source of power and the first gating means for applying said command signal to said first gating means after a delay period for stabilizing the synchronizing means.

* * * * *